(12) United States Patent
Nishijima et al.

(10) Patent No.: US 7,093,849 B2
(45) Date of Patent: Aug. 22, 2006

(54) COVER BODY FOR AIR BAG APPARATUS

(75) Inventors: Kazuyoshi Nishijima, Shizuoka (JP); Shuji Yamada, Shizuoka (JP); Masami Tonooka, Shizuoka (JP); Satoshi Kitazawa, Shizuoka (JP); Takahiro Suwama, Shizuoka (JP); Sadayuki Kawakami, Shizuoka (JP); Hiroshi Yakushiji, Shizuoka (JP); Ryuji Hori, Shizuoka (JP); Masatoshi Ishigaki, Shizuoka (JP)

(73) Assignee: Nihon Plast Co., Ltd., Shizuoka (JP)

( * ) Notice: Subject to any disclaimer, the term of this patent is extended or adjusted under 35 U.S.C. 154(b) by 317 days.

(21) Appl. No.: 10/667,376

(22) Filed: Sep. 23, 2003

(65) Prior Publication Data

US 2004/0056455 A1    Mar. 25, 2004

(30) Foreign Application Priority Data

| Sep. 24, 2002 | (JP) | ............................. 2002-277418 |
| Sep. 30, 2002 | (JP) | ............................. 2002-287965 |
| Nov. 28, 2002 | (JP) | ............................. 2002-346434 |
| Apr. 21, 2003 | (JP) | ............................. 2003-115646 |
| Jun. 25, 2003 | (JP) | ............................. 2003-181801 |
| Jun. 25, 2003 | (JP) | ............................. 2003-181802 |

(51) Int. Cl.
*B60R 21/20* (2006.01)

(52) U.S. Cl. .................................... 280/728.3; 280/732

(58) Field of Classification Search ............ 280/728.3, 280/731, 732; 428/35.7; 525/248, 242, 525/127
See application file for complete search history.

(56) References Cited

U.S. PATENT DOCUMENTS

| 5,335,939 | A | * | 8/1994 | Kuriyama et al. | ....... 280/728.3 |
| 5,582,424 | A |   | 12/1996 | Okuyama et al. | |
| 5,779,262 | A | * | 7/1998 | Totani et al. | ............ 280/728.3 |
| 5,806,889 | A |   | 9/1998 | Suzuki et al. | |
| 6,012,735 | A |   | 1/2000 | Gray et al. | |
| 6,076,851 | A |   | 6/2000 | Davis, Jr. et al. | |
| 6,145,871 | A |   | 11/2000 | Davis, Jr. et al. | |
| 6,318,752 | B1 |  | 11/2001 | Warneke et al. | |
| 6,467,801 | B1 | * | 10/2002 | Preisler et al. | ........... 280/728.3 |
| 6,644,684 | B1 | * | 11/2003 | Tsuji et al. | ................. 280/727 |
| 6,726,239 | B1 | * | 4/2004 | Teranishi et al. | ........ 280/728.3 |

(Continued)

FOREIGN PATENT DOCUMENTS

FR          2809692 A       12/2001

(Continued)

*Primary Examiner*—Paul N. Dickson
*Assistant Examiner*—Tiffany L. Webb
(74) *Attorney, Agent, or Firm*—Sughrue Mion, PLLC

(57) ABSTRACT

A cover body of a vehicle air bag apparatus, being comprised of a covering portion which is formed integrally with an interior panel body and which has a door portion defined by a tear seam formed in a back of the interior panel body, and, a backing portion joined to a back of the covering portion. The covering portion is made of polyolefin resin having a flexual elastic modulus of from 1500 to 3500 MPa, a tensile strength of from 17 to 40 MPa, an Izod impact strength of from 3.0 to 15.0 kJ/m$^2$, and an elongation of 400% or less. The backing portion is made of thermoplastic olefin which is softer and has a greater elongation. The backing portion is comprised of a reinforcing portion at a back of the door portion, a surrounding base at the back of the covering portion, and a hinge portion joining the reinforcing portion and the surrounding base.

13 Claims, 17 Drawing Sheets

U.S. PATENT DOCUMENTS

2002/0014759 A1    2/2002    Desprez

FOREIGN PATENT DOCUMENTS

| JP | 51-1932 A | 1/1976 |
| JP | 8-48204 A | 2/1996 |
| JP | 9-86321 A | 3/1997 |
| JP | 9-109816 A | 4/1997 |
| JP | 2000-16216 A | 1/2000 |
| JP | 2001-39254 A | 2/2001 |
| JP | 2001-294114 A | 10/2001 |
| JP | 2002-12116 A | 1/2002 |
| JP | 2002-59801 A | 2/2002 |
| JP | 2002-507172 A | 3/2002 |
| JP | 2002-347556 A | 12/2002 |

* cited by examiner

FIG.23
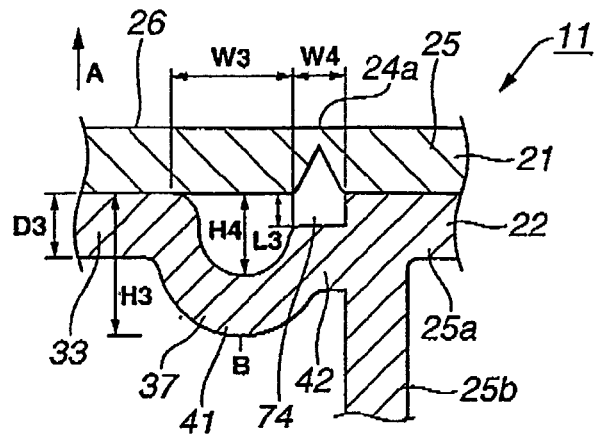
FIG.24A FIG.24B
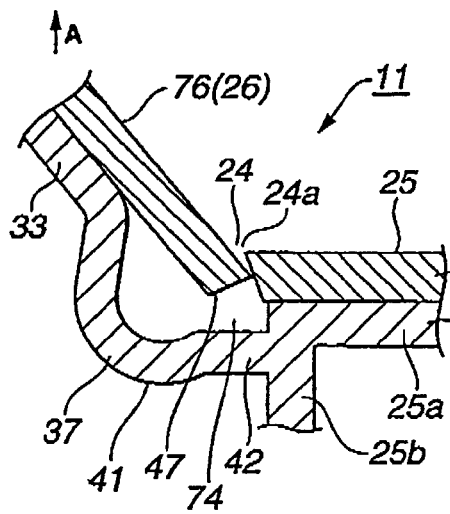 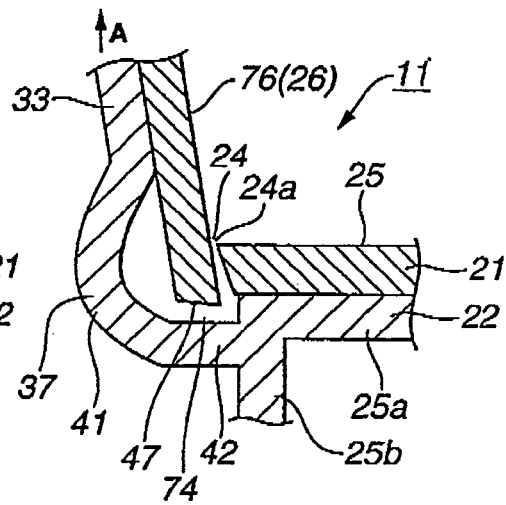
FIG.25
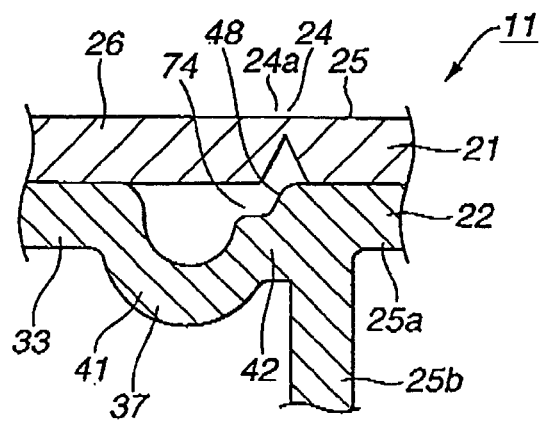

COVER BODY FOR AIR BAG APPARATUS

BACKGROUND OF THE INVENTION

The present invention relates to a cover body for an air bag apparatus which is integrally formed with an internal panel of a vehicle. This invention is applicable particularly, but not exclusively, to a cover body for an air bag apparatus to be used for a front passenger seat, the cover body being formed integrally with an instrument panel.

Instrument panels located below the front window of a vehicle have been designed as instrument panels with hidden seamlines, which have an integrated air bag apparatus comprising an air bag and an inflator stored inside the instrument panel. Within the instrument panel, a lower portion of the air bag apparatus is fixed to a steering member disposed along the direction of the width of a vehicle, and an upper portion thereof is attached to a pair of attaching members consisting of a back and front member which are formed integrally with a rear of an instrument panel.

Japanese Patent Provisional Publication 2001-39254 discloses an air bag apparatus wherein a door portion is formed in a portion of an instrument panel directly covering an air bag between a pair of attaching members by the instrument panel itself being sectioned by a tear seam formed in a closed-loop shape on a back surface thereof.

By forming the door portion in the instrument panel itself in this manner, an outer appearance of the instrument panel is maintained in an attractive state, as compared to forming an opening in the instrument panel and emplacing a separately formed lid which closes the opening and opens upon deployment of an air bag. An aluminum backing member is formed on a back inner side of the door portion, the backing member extending past the tear seam to beyond the door portion. When the air bag inflates, the inflation force of the air bag pushes the entire door portion by pushing through the backing member, and the door portion is torn along the tear seam and the door portion is torn away. The torn away door portion swings outside to a front outer side of the instrument panel with a portion of the backing member directly under the tear seam acting as a hinge portion, and from the opening formed by the severed door portion, the air bag inflates into the interior of the vehicle.

However, according to the above related art, since the backing member joined to the back side of the door portion of the instrument panel is metal (in the above example, aluminum), the inflation force of the air bag does not directly act on a portion of the tear seam which is covered by the backing member. That is, as the backing member is formed from metal and is therefore not soft, it is not possible for the inflation force of the air bag to directly act on the portion of the tear seam covered by the backing member. Rather, the tear seam is torn by force being exerted through the entire metal backing member, which produces an indirect pushing effect against the entire door portion. Therefore, it is necessary for the air bag apparatus to use an inflator for inflating the air bag which is large-size and high-powered, in order for the tear seam to tear properly with certainty. Such a solution is a disadvantage with respect to weight and cost To solve this problem, Japanese Patent Provisional Publication 2002-347556 by the present applicant discloses an air bag apparatus wherein the backing member is made from a plastic material. Specifically, the backing member is made from a soft resin material, and the location of the backing member directly under the tear seam receives the inflation force of an air bag, is pushed up, and easily deforms, thus allowing a pushing-up force to act directly against the tear seam. In more detail, a thermoplastic olefin elastomer resin is used as material for the backing member, the resin having a flexural elastic modulus of 6000 kgf/cm$^2$ or less, preferably 4500 kgf/cm$^2$ or less, and as an embodiment, 2800 kgf/cm$^2$.

Japanese Patent Provisional Publication (Heisei) 9-109816 discloses an arrangement where an instrument panel doubles as a passenger-side air bag cover, and a reinforcing portion is disposed on a back side thereof. Materials for the instrument panel and reinforcing portion in this combination are preferably a polyolefin and olefin elastomer, respectively. Specifically, the instrument panel is polypropylene resin which has an elongation of more than 300%, a flexural elastic modulus of more than 20000 kgf/cm$^2$, a temperature of deflection under load of more than 120° C., and an Izod impact strength at 23° C. of more than 15 kg·cm/cm. The reinforcing portion is made of an olefin elastomer which has a flexural elastic modulus of more than 3000 kgf/cm$^2$, and an Izod impact strength at −40° C. of more than 20 kg·cm/cm.

Japanese Patent Provisional Publication (Heisei) 8-48204 discloses a two-layer cover for a gas bag module where hardness of the first layer is in a range of approximately Shore D hardness 32 to 43, and hardness of the second layer is in an approximate range of Shore A hardness 45 to 80.

Also, in an instrument panel with hidden seamlines having an air bag apparatus integrally formed therewith as in the above examples, a bent groove portion is formed in the backing member which is directly under a location to constitute the hinge of the door portion.

A backing member made of thermoplastic polyurethane foam is disposed on a back side of a door portion, and extends beyond a tear seam and beyond the door portion. Due to the inflation force during deployment of an air bag, the entire door portion is pushed up by force exerted through the backing member, and the door portion is torn along the tear seam and is completely torn away. The torn away door portion swings outward to an outside of the instrument panel with a portion of the backing member directly under the tear seam acting as a hinge, and from an opening formed by the severed door portion, the air bag expands into the interior of a vehicle.

SUMMARY OF THE INVENTION

However, such an air bag apparatus disposed inside an instrument panel must be able to fulfill certain requirements for fully and properly functioning as a safety device. For example, upon collision impact of a vehicle, an inflator must be activated to instantaneously inflate an air bag, and a door portion of an instrument panel which forms an air bag cover must be torn along a tear seam by inflation force of the air bag, and the air bag must be inflated smoothly through an opening formed in the instrument panel in the direction of a vehicle interior. Further, since this operation is to be performed within a vehicle which experiences a wide range of high and low temperatures, sufficient mechanical characteristics must be stably maintained throughout a wide temperature range in order for smooth operation of an air bag apparatus to be guaranteed under practical temperature conditions.

Further, an internally integrated air bag apparatus is desired to be in harmony with the entire instrument panel in which it is integrated, which also affects the appearance of the entire vehicle interior.

According to the related art, since a backing member joined to a back side of the door portion of the-instrument panel joins an attaching portion (part of a supporting structure for an air bag apparatus) and door portion by a hinge portion which is U-shaped in cross-section, portions of a predetermined width not supported by the backing member are formed at portions of the instrument panel which are directly over the hinge portion. During inflation of the air bag, due to these portions of the instrument panel not being supported, the instrument panel itself receives the impact of the air bag. Thus, it is necessary for the instrument panel to possess a high impact resistance which is not otherwise normally required in an instrument panel. This is a factor which increases cost. And since the hinge portion of the backing member is of a predetermined width, stress is concentrated at portions of the backing member which are in contact with the door portion during inflation of the air bag. This leads to a possibility of unintended tearing, such as cracking occurring at portions other than the tear guide portion of the door portion. In such instances, an opening for the air bag to expand through, which also serves as an air bag pathway, is thus not properly formed along the intended tear guide portion.

It is therefore an object of the present invention to provide a cover body for an air bag apparatus which is superior in safety and reliability, also durability and appearance, across a wide range of temperatures.

It is another object of the present invention to provide a cover body for an air bag apparatus which is capable of properly tearing a tear seam which is covered by a backing member, such that a desirable expansion path will be formed, across a wide temperature range.

An aspect of the present invention resides in a cover body covering an air bag apparatus, the cover body being integral with an interior panel of a vehicle. The cover body comprises a covering portion formed integrally with an interior panel body, the covering portion having a door portion defined by a tear seam formed in a closed-loop shape in a back surface of the interior panel body, and, a backing portion which is joined to a back of the covering portion including the door portion. The covering portion is made of polyolefin resin which has a flexual elastic modulus of from 1500 to 3500 MPa, a tensile strength of from 17 to 40 MPa, an Izod impact strength of from 3.0 to 15.0 kJ/m$^2$, and an elongation of 400% or less. The backing portion is made of thermoplastic olefin which is softer and has a greater elongation than the polyolefin resin. The backing portion comprises a reinforcing portion joined to a back surface of the door portion, a surrounding base which is joined to the back surface of the covering portion surrounding the door portion and having an attachment portion, and a hinge portion having an end joined to the reinforcing portion and another end joined to the surrounding base.

BRIEF DESCRIPTION OF THE DRAWINGS

FIG. 23 is an enlarged cross-sectional view of the instrument panel and backing member showing a hinge portion with a lowered joining portion according to a fourth embodiment of the present invention.

FIG. 24A is an enlarged cross-sectional view of the hinge portion of FIG. 23 during initial inflation stage of an air bag.

FIG. 24B is an enlarged cross-sectional view of the hinge portion of FIG. 23 following the initial inflation stage shown in FIG. 24A.

FIG. 25 is an enlarged cross-sectional view of the hinge portion of FIG. 23 showing a modification thereof.

DETAILED DESCRIPTION OF THE INVENTION

Figure 1:
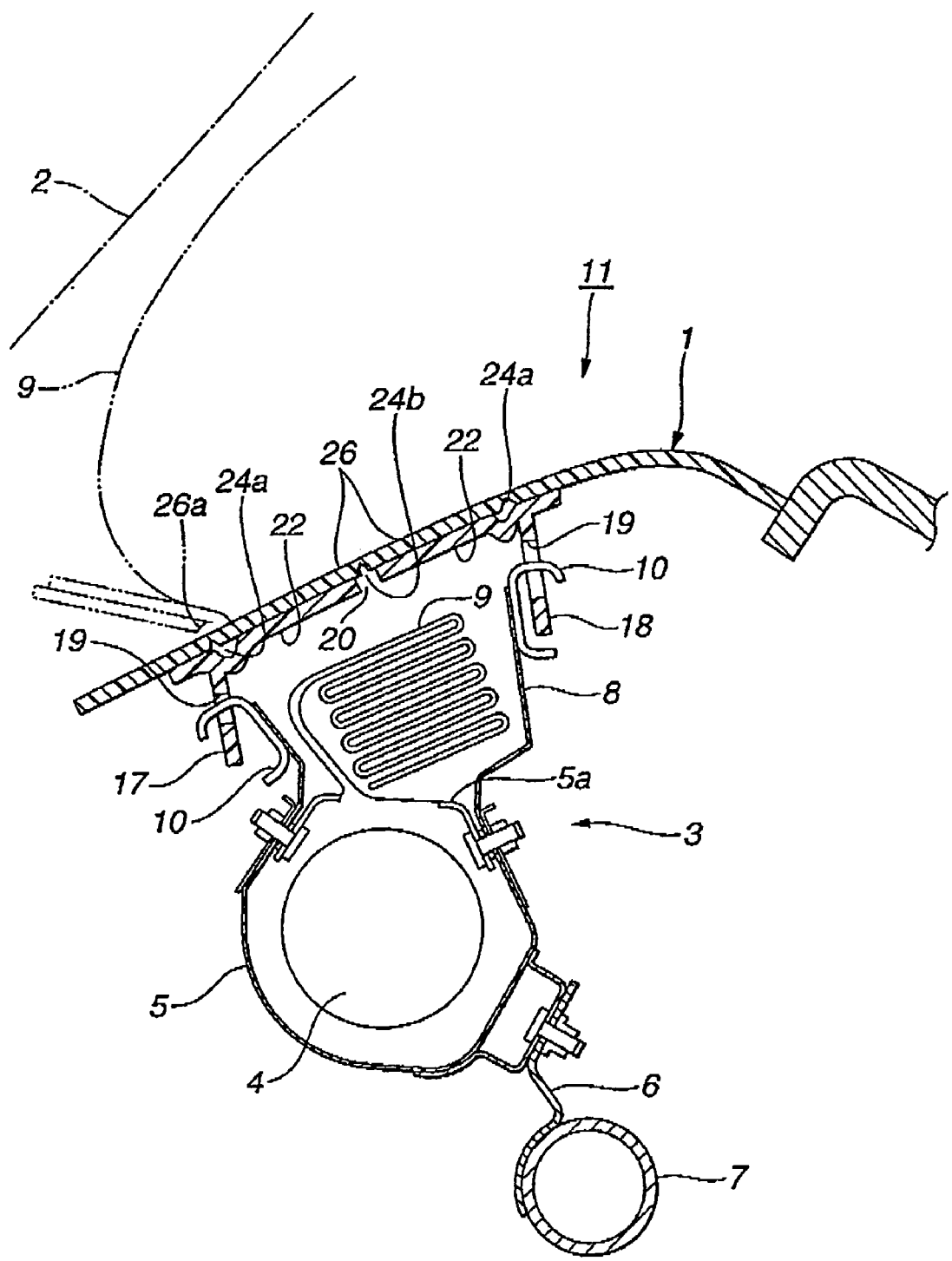
FIG. 1 is a cross-sectional view showing an instrument panel and an air bag apparatus formed integrally therewith according to a first embodiment of the present invention.
Figure 2:
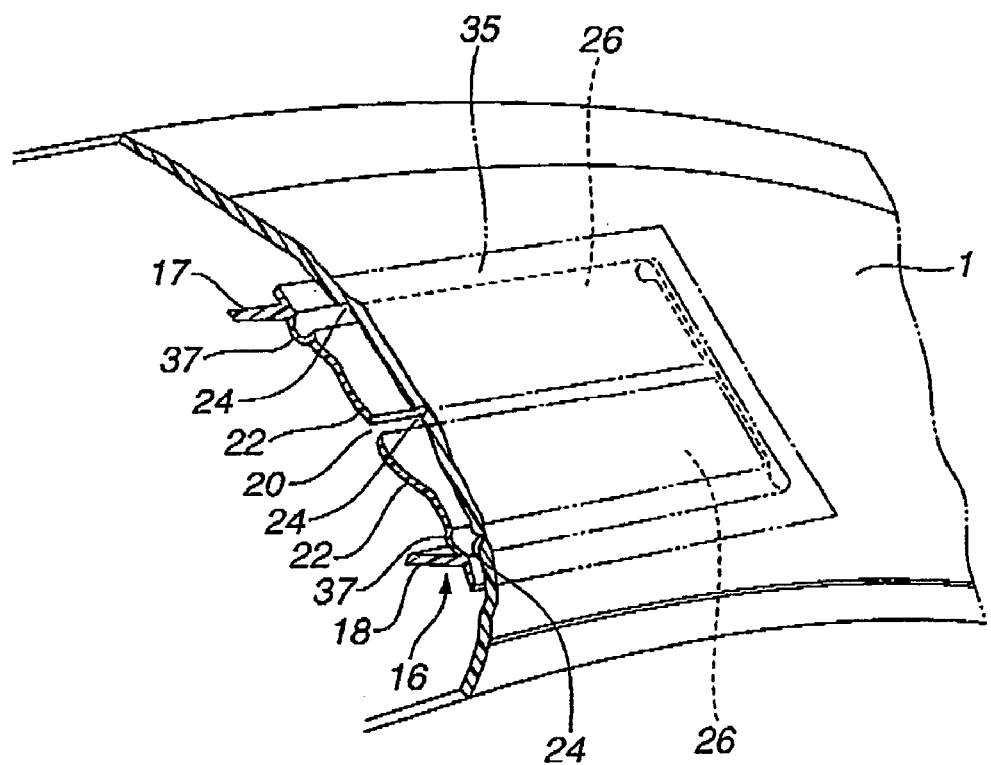
FIG. 2 is a perspective view of the instrument panel of FIG. 1 showing a door portion and a backing member on a back side of the door portion.

Referring to FIGS. 1 to 9, there is discussed a first embodiment of a cover body for an air bag apparatus in accordance with the present invention.

A cover body for an air bag apparatus of the first embodiment comprises a covering portion 11 formed integrally with an instrument panel 1 of a vehicle which is disposed below a front window 2, and a backing member 22 which is attached to an inner side of covering portion 11 as a support member. Since covering portion 11 is formed integrally with instrument panel 1, it will be understood that the ensuing discussion of instrument panel 1 also infers covering portion 11. Instrument panel 1 is a molded element formed with hard polypropylene resin having a flexual elastic modulus of 30300 kgf/cm$^2$ (3092 MPa), a surface of which is close-grained to a matte finish to prevent reflection from front window 2. Further, best results are achieved by using hard synthetic resin having a flexual elastic modulus of 14700 kgf/cm$^2$ (1500 MPa) or more (preferably 19000 kgf/cm$^2$ (1939 MPa) or more) for instrument panel 1. Material used for covering portion 11 has a flexual elastic modulus of from 1500 to 3500 MPa, a tensile strength of from 17 to 40 MPa, an Izod impact strength from 3.0 to 15.0 kJ/m$^2$, and an elongation of 400% or less.

Air bag apparatus 3 is disposed inside of instrument panel 1, that is, on a side of instrument panel 1 that is invisible to occupants inside the vehicle.

Air bag apparatus 3 comprises a reaction can 5, an inflator 4 contained inside reaction can 5, and a bracket 6 which fixes reaction can 5 to a steering member 7. A mid-retainer 5a is fixed to reaction can 5. An air bag 9 is folded and stored inside a case 8, and reaction can 5 forms a single integral unit with case 8. Arrays of hooks 10 are arranged at both sides of case 8, respectively.

Figure 5:
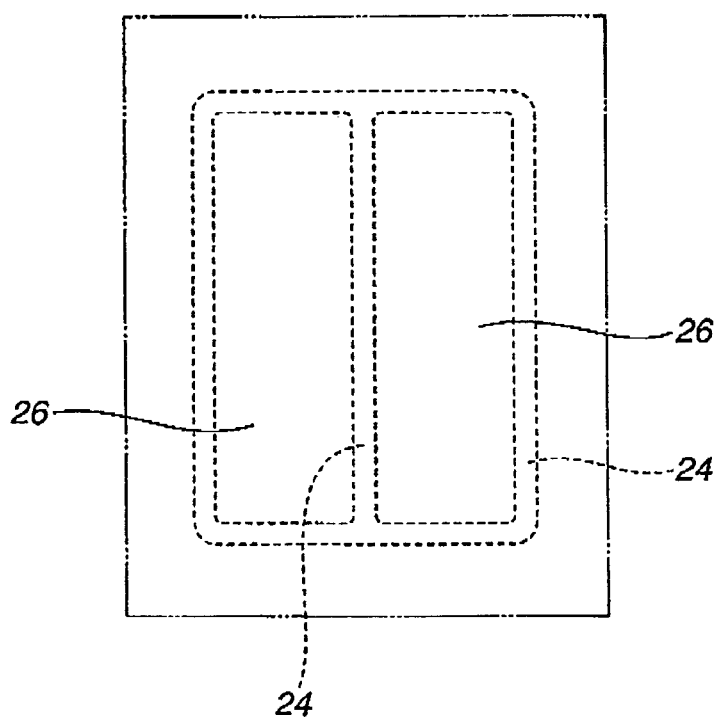
FIG. 5 is an underside view of the instrument panel of FIG. 1 showing the layout of a tear seam.
Figure 6:
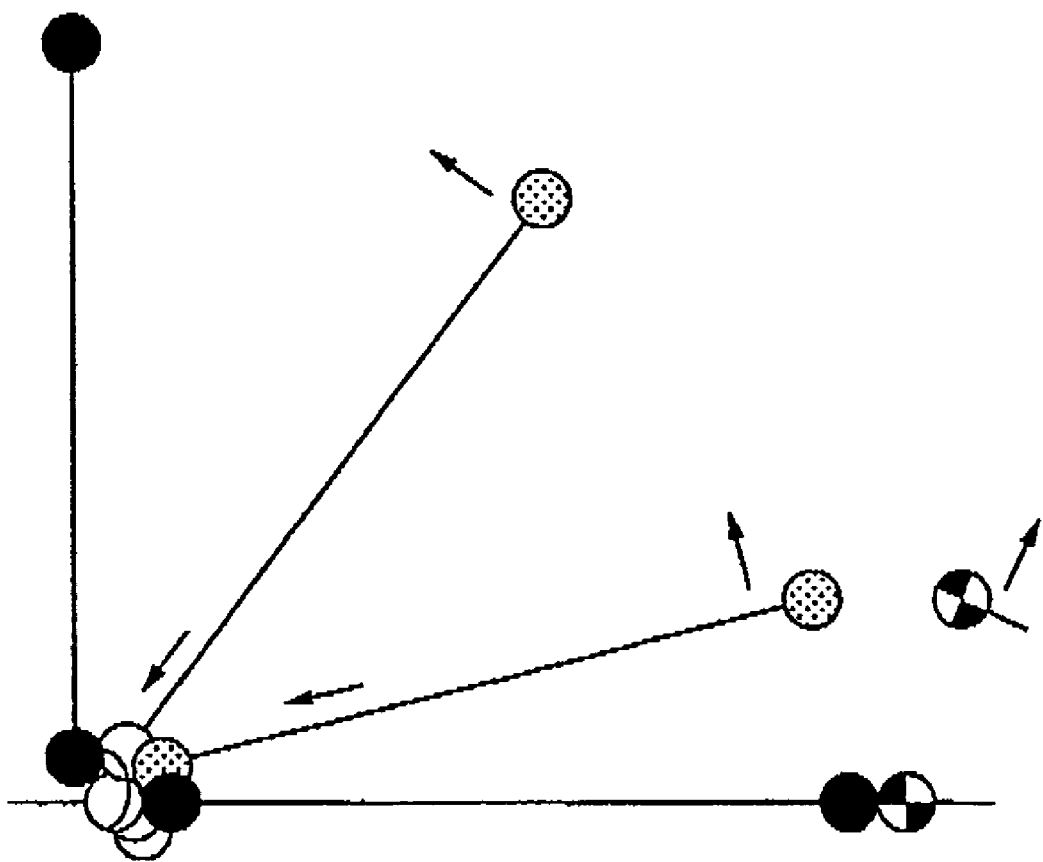
FIG. 6 is a diagram of the door portion of FIG. 1 showing a process of the door portion opening.

A rectangular door portion 26 is formed in covering portion 11, covering portion 11 being directly over a top portion of airbag apparatus 3. Door portion 26 is defined in covering portion 11 by a tear seam 24 formed in a back side or surface of instrument panel 1, i.e., in an inner side thereof invisible to occupants of the vehicle, such that the back side of instrument panel 1 is divided into two sections, and appears as two adjacent rectangles, as shown in FIG. 5. Tear seam 24 is a cut out groove formed by machining with a rotating blade (such as a milling blade) after instrument panel 1 has been formed. Preferably, a thickness of tear seam 24 is from 0.1 to 1.5 mm, 0.3 mm in this embodiment, and thus, irregularities or similar malconformations are avoided which can frequently occur on a surface of an instrument panel facia by forming such tear seams by molding process. However, tear seam 24 can be simultaneously formed by molding process of instrument panel 1. In such a case, there would be a resultant lowering of production cost.

A backing member 22 is joined to a back surface of covering portion 11 including door portion 26 of instrument panel 1. Injection-molded backing member 22 is made from soft thermoplastic olefin elastomer (TPO) resin having a flexual elastic modulus of 2800 kgf/cm$^2$ (268 MPa). Further, material other than TPO resin can be used for backing member 22, with good results being obtained by using any variety of soft elastomer resin, e.g., TPU, TPE, SES, SEBS, as they are commonly known. Good results are also achieved with material having a flexual elastic modulus of 6000 kgf/cm$^2$ (612 MPa) or less (preferably, 4500 kgf/cm$^2$ (459 MPa) or less). The thermoplastic olefin elastomer of backing portion 22 is softer and has a greater elongation than the polyolefin resin of covering portion 11. Backing member 22 is larger in size than door portion 26 and extends beyond tear seam 24 to outside tear seam 24, and a lattice-shaped joining rib portion (not shown) is disposed both inside and outside tear seam 24. The joining rib portion is melted so as to be fusable through a process of ultrasonic vibration welding. Joining force between backing member 22 and instrument panel 1 is thereby achieved, and there are no adverse effects on the close-grained matte finish on the surface of instrument panel 1. Also, since many joining points are formed at free locations on backing member 22, the joining force between both backing member 22 and instrument panel 1 is increased.

It is important that the material used for covering portion 11 possess the aforementioned characteristics. Specifically, in an instance where its elastic modulus is less than 1500 MPa, the load-bearing ability of the material is insufficient, and material deforms too easily and it becomes difficult to maintain appearance of the instrument panel. On the other hand, if its elastic modulus exceeds 3500 MPa, door portion 26 is too strong when operation of air bag apparatus 3 is effected upon collision impact of a vehicle, and much greater power to inflate air bag 9 for smooth tearing of tear seam 24 is necessary. Preferable flexual elastic modulus is within a range of from 2000 to 3200 MPa, and more preferably, from 2500 to 3000 MPa. In an instance where tensile strength is less than 17 MPa, shock impact of a collision which is insufficient to effect deployment of air bag 9 will nevertheless be sufficient to cause damage along tear seam 24 by instrument panel 1 and therefore covering portion 11 receiving the force of the shock. Also, in an instance where tensile strength is more than 40 MPa, it is not quite easy to rip tear seam 24 stably alon gthe shape it is designed in a usual condition range, Preferable tensile strength is in a range of from 20 to 35 MPa, more preferably, from 23 to 30 MPa.

In an instance where the Izod impact strength is less than 3.0 kJ/m$^2$ or beyond 15 kJ/m$^2$, it is not easy to rip tear seam 24 stably along the shape it is designed in a usual condition range. Preferable Izod impact strength is in a range of from 3.8 to 7.5 kJ/m$^2$, more preferably from 4.0 to 6.0 kJ/m$^2$. Further, in an instance where the elongation exceeds 400%, it is not easy to rip tear seam 24 stably along the shape it is designed in a usual condition range. A preferable elongation is in a range of from 30 to 400%, more preferably from 100 to 400%.

Resin material used for covering portion 11 and backing member 22 according to the present invention are chosen from among commercially available products.

A tube body 16 which is substantially cylindrical and square is formed at a position both close to and beyond tear seam 24 of backing member 22, and comprises an attachment portion 17, 18 which constitute front and back facing surface portions respectively of tube body 16. Since backing member 22 is formed from resin, attachment portion 17, 18 is easily formed integrally therewith. Each facing surface portion of attachment portion 17, 18 respectively comprises an attachment hole 19, onto which the arrays of hooks 10 of air bag apparatus 3 attach.

A base portion of each facing portion of attachment portion 17, 18 is formed in a substantial L-shape in cross-section and extends outward to form an inner surrounding portion 35 as an outer peripheral flange which is square and flat. The joining rib portion is also formed on a surface of inner surrounding portion 35 which faces with the back side of instrument panel 1, that is, which faces with the back surface of covering portion 11, joining force with instrument panel 1 being thus achieved.

Figure 7:
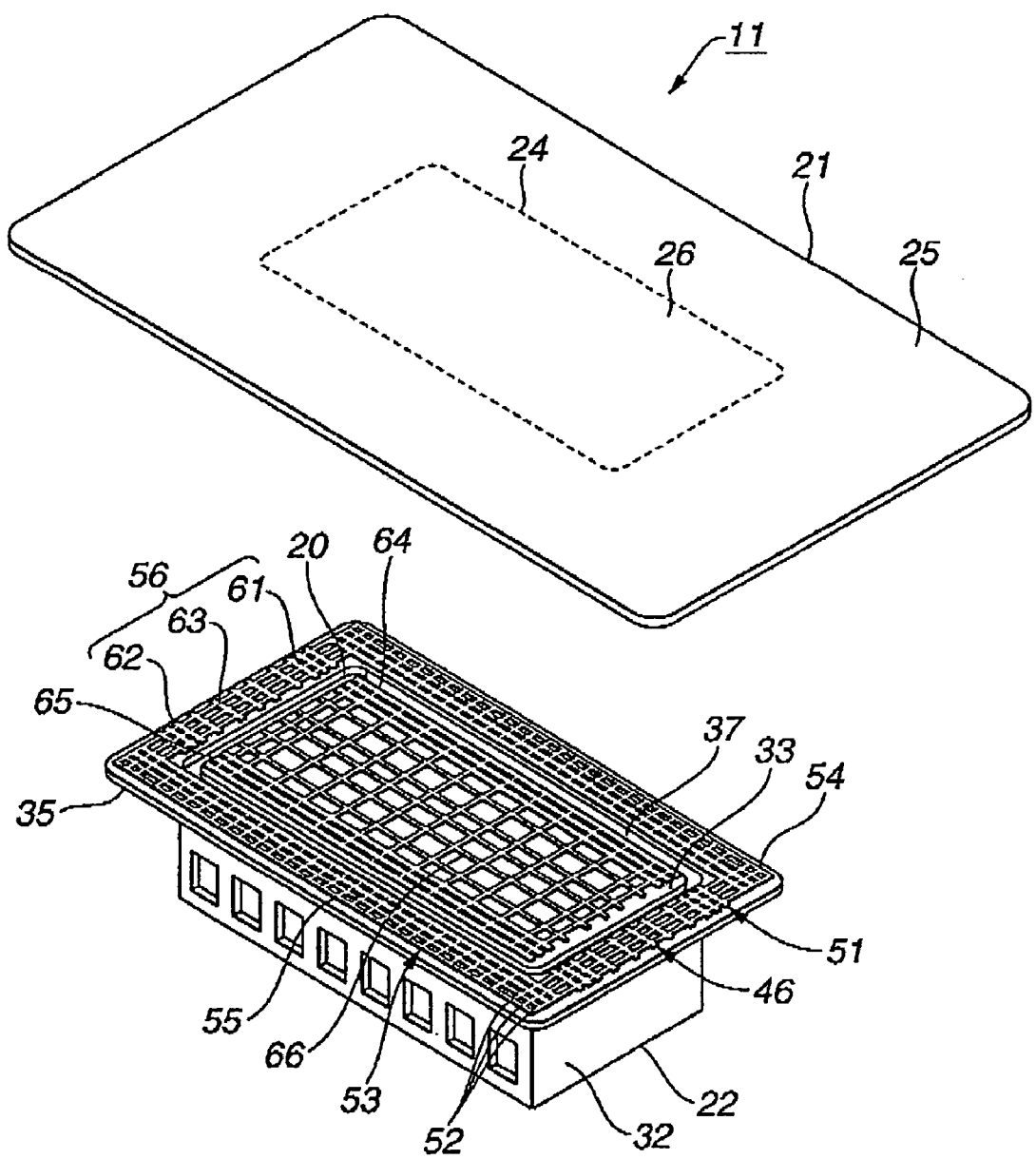
FIG. 7 is a perspective view of the instrument panel and the air bag apparatus of FIG. 1 showing a joining rib portion on the backing member.
Figure 8:
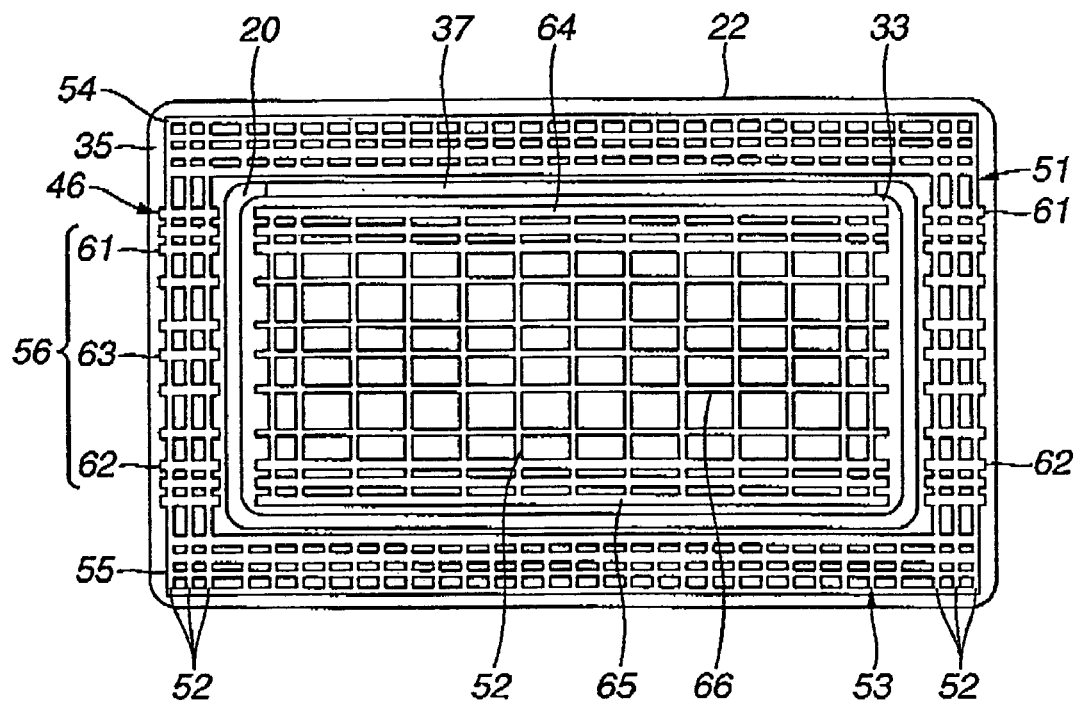
FIG. 8 is a plan view of the backing member showing the joining rib portion of FIG. 7.
Figure 9:
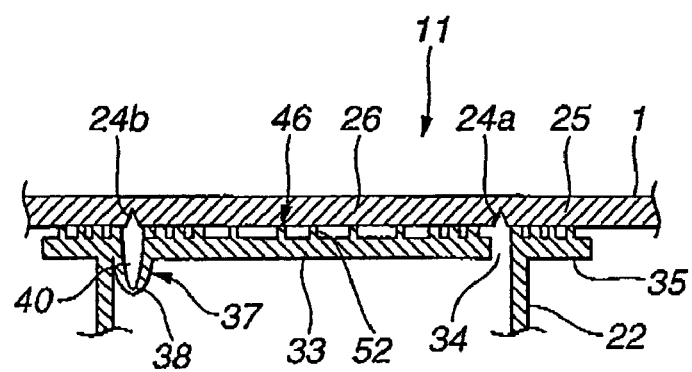
FIG. 9 is a cross-sectional view of the instrument panel and backing member showing the joining rib portion of FIG. 7.

The joining rib portion will be explained with reference to FIGS. 7 to 9. While door portion 26 is shown as only a single opening door swinging from only one edge thereof in FIGS. 7 to 9, it will be understood that door portion 26 is not limited in this manner, and that FIGS. 7 through 9 are meant to aid understanding of the relative disposition of the rib portion. Thus, referring to FIGS. 7 and 8, a joining rib portion 46 comprising a plurality of joining ribs is formed on a surface of backing member 22 which faces instrument panel 1. Joining rib portion 46 comprises first rib portion 51, second rib portion 52, and third rib portion 53, which are formed having a uniform projecting dimension or height selected from 1 to 3 mm, 2 mm in this embodiment. Also, second rib portion 52 and third rib portion 53 are formed with a breadth-wise dimension or width selected from 1 to 3 mm, 1 mm in this embodiment.

First rib portion 51 is formed to have an angle of ±30° with respect to a length-wise direction of backing member 22 which is the direction of reciprocative movement of vibration welding of instrument panel 1 and backing member 22, i.e. the width-wise direction of the vehicle. That is, first rib portion 51 is formed in the direction of the width of the vehicle.

Also, as shown in FIGS. 7 and 8, the pitch or space between adjacent ribs of first rib portion 51 is formed to be from 3 to 10 mm respectively on both inner surrounding portion 35 and door reinforcement portion 33. First rib portion 51 formed on inner surrounding portion 35 comprises a front fixing rib portion 54 formed at a front of a front edge portion of a separation portion 20, a rear fixing rib portion 55 formed at a rear of a rear edge portion of separation portion 20, and a lateral fixing rib portion 56 which is formed on a side of both side edge portions of separation portion 20.

Front fixing rib portion 54 and rear fixing rib portion 55 are formed along the entire lengths of the front edge portion and rear edge portion of separation portion 20. Also, front fixing rib portion 54 and rear fixing rib portion 55 are formed symmetrically to one another in the fore and aft direction of backing member 22. Further, a portion of front fixing rib portion 54 and rear fixing rib portion 55 which is near tear seam 24 and therefore near separation portion 20, specifically, a portion which is 20 mm or less of tear seam 24, preferably 10 mm or less, is formed having a width in a range of from one to three times a width of second rib portion 52 and third rib portion 53, and is formed with preferably two times a width of second rib portion 52 and third rib portion 53, i.e., 2 mm, and a pitch of from 3 to 5 mm.

Lateral fixing rib portion 56 comprises a front lateral fixing rib portion 61 formed at a front of both side edge portions of separation portion 20, a rear lateral fixing rib portion 62 formed at a rear of both side edge portions of separation portion 20, and a middle fixing rib portion 63 formed between front lateral fixing rib portion 61 and rear lateral fixing rib portion 62. Front lateral fixing rib portion 61 and rear lateral fixing rib portion 62 are respectively disposed at a distance from front fixing rib portion 54 and rear fixing rib portion 55. A pitch between individual ribs of front lateral fixing rib portion 61 and rear lateral fixing rib portion 62 is substantially equal to a portion of front fixing rib portion 54 and rear fixing rib portion 55 which is closest to separation portion 20. A pitch of individual ribs of middle fixing rib portion 63 is formed wider than that of front lateral fixing rib portion 61 and rear lateral fixing rib portion 62, and pitch is somewhat narrower near a center zone taken in a front and back direction at both edges of separation portion 20.

First rib portion 51 formed on door reinforcement portion 33 comprises a front opening rib portion 64 formed at a rear of the front edge portion of separation portion 20, a back opening rib portion 65 formed at a front of the rear edge portion of separation portion 20, and a middle opening rib portion 66 formed between front opening rib portion 64 and back opening rib portion 65. Front opening rib portion 64 and back opening rib portion 65 are respectively formed between front lateral fixing rib portion 61 and between rear lateral fixing rib portion 62, as extensions of front lateral fixing rib portion 61 and rear lateral fixing rib portion 62. A pitch of individual ribs of front opening rib portion 64 and back opening rib portion 65 is substantially equal to the pitch of front lateral fixing rib portion 61 and rear lateral fixing rib portion 62.

Further, each rib of middle opening rib portion 66 is formed with a smaller width than front opening rib portion 64 and back opening rib portion 65. Also, middle opening rib portion 66 is formed having a wider pitch than front opening rib portion 64 and back opening rib portion 65, a pitch thereof being somewhat narrower in a center zone thereof in the front and back direction of door reinforcement portion 33.

Second rib portion 52 is formed along the fore and aft direction to be substantially perpendicular to first rib is portion 51. Accordingly, second rib portion 52 is formed having an angle of ±60° or more relative to the direction of reciprocative movement of vibration welding. Also, second rib portion 52 has a width smaller than first rib portion 51. Further, second rib portion 52 is formed both on an entire surface of door reinforcement portion 33 as well as on inner surrounding portion 35 at both side edge portions of separation portion 20. A pitch between individual ribs at a portion of second rib portion 52 near tear seam 24 and therefore near separation portion 20, specifically, a pitch at a portion of second rib portion 52 within at least 20 mm of tear seam 24, preferably within 10 mm, is from 3 to 10 mm, preferably 4 mm.

Also, a portion of second rib portion 52 in the center zone in a width-wise direction of door reinforcing portion 36 is formed with a wider pitch than a portion thereof located in proximity to separation portion 20.

Accordingly, a portion of joining rib portion 46 along and near tear seam 24 is formed in greater density than a portion thereof not in proximity to tear seam 24 owing to the particular dimensions of front fixing rib portion 54, rear fixing rib portion 55, front lateral fixing rib portion 61, rear lateral fixing rib portion 62, and second rib portion 52.

Further, third rib portion 53 is formed along a direction parallel to second rib portion 52 which is formed in a predetermined direction, and individual ribs thereof have a width substantially equal to the width of ribs of second rib portion 52. Third rib portion 53 is formed on inner surrounding portion 35, and a pitch between individual ribs thereof is selected from 5 to 30 mm, 5 mm in this embodiment.

As a result, joining rib portion 46 is formed in a lattice shape. Also, according to the first embodiment, a surface area of a welding area of backing member 22 is formed to be, for example, 660 $cm^2$, and joining rib portion 46 is welded to have a total surface area of 150 $cm^2$. This welding area of backing member 22 is a joined portion of instrument panel 1 and backing member 22, that is, an upper surface of backing member 22 which faces the back side of instrument panel 1. Therefore, joining rib portion 46 occupies 22.7% of the surface area of the upper surface of backing portion 22. Accordingly, joining rib portion 46 has a surface area in a range of from 10 to 30% of the surface area of the upper surface of backing member 22 which faces the back side of instrument panel 1.

Instrument panel 1 and backing member 22 are placed in a vibration welding machine, and with instrument panel 1 in a fixed state, door reinforcement portion 33 and inner surrounding portion 35 of backing member 22 are positioned and aligned over door portion 26 and an outer surrounding portion 25 respectively. Outer surrounding portion 25 is a portion of covering portion 11 which is around or encircles door portion 26. Backing member 22 is pressed to the back side of instrument panel 1, and backing member 22 is vibrated in the length-wise direction.

Through the vibration process, first rib portion 51 of joining rib portion 46 made of TPO resin melts to become melted resin between the flat joining surface of joining rib portion 46 and instrument panel 1 which are in mutual contact. A join portion or weld layer is thereby formed between instrument panel 1 and backing member 22.

According to the first embodiment, by reinforcing in a direction which intersects the reciprocative direction of vibration welding of joining rib portion 46, weld strength is improved and an expected weld strength is obtained, as compared to an instance where a width of first rib portion 51 is less than a width of second rib portion 52 and third rib portion 53. It is therefore easy to regulate the amount of strength during the welding process. Also, less welding energy is required, and an undue concentration of local welding energy is prevented, as compared with an instance where a width of first rib portion 51 is larger than three times a width of second rib 52 and third rib 53, as in, for example, an instance where instrument panel 1 and backing member 22 are joined by a substantially complete surface welding. Instrument panel 1 and backing member 22 are therefore easily and securely welded.

Certain advantages can be realized by joining rib portion 46 having a surface area of from 10% to 30% of the surface area of the joined portion between instrument panel 1 and backing member 22. Regulation of strength during the welding process is performed more easily and weld strength is better than in an instance where joining rib portion 46 is less than 10% of the surface area of the portion where instrument panel 1 and backing member 22 are joined. Also, energy necessary for vibration welding of instrument panel 1 and backing member 22 is less than in an instance where joining rib portion 46 is more than 30% of the surface area of the 15 portion where instrument panel 1 and backing member 22 are joined. And since this energy is easily applied in an even manner, instrument panel 1 and backing member 22 are easily welded together.

Since the density of joining rib portion 46 is small at a portion thereof not in proximity to tear seam 24, instrument panel 1 and backing member 22 are easily welded together.

Thus, weld strength is improved in a portion around and in proximity to tear seam 24 and a predetermined weld strength is achieved, and tear seam 24 tears properly due to pressure of expansion of air bag 9. Door portion 26 thereby forms properly and smoothly, and thus an opening for air bag 9 to pass through upon deploying is smoothly and properly formed.

Also, an amount of welding heat during welding of instrument panel 1 and backing member 22 is maintainable at a necessary minimum. Further, undesirable effects due to inappropriate welding heat are prevented, such as damage to the outer appearance of instrument panel 1, or deformation of instrument panel 1.

Since backing member 22 is a separate and individual element from instrument panel 1, an angle of each facing portion of attachment portion 17, 18 is set freely without forming undercuts in molds for instrument panel 1. Since attachment portion 17, 18 is formed as a pair of front and back facing surface portions, the strength thereof is increased, support strength of air bag apparatus 3 is improved, and the ability of tube body 16 to guide the direction of inflation of air bag 9 is enhanced. Further, as attachment portion 17, 18 is formed integrally with backing member 22, an increase in the number of components is avoided.

A separation portion 20 is formed as a small-width slit in an H-shape such that door portion 26 is adjoined at a front and rear edge portion thereof at a portion of backing member 22 directly covering tear seam 24. A portion of backing member 22 directly under a portion of tear seam 24 at the front edge portion and rear edge portion of door portion 26 is formed into a hinge portion 37 which is a bent shape and disposed astride tear seam 24. Separation portion 20 is therefore formed under and along tear seam 24. Further, while separation portion 20 is formed as a portion where there is complete separation or detachment according to the first embodiment, separation portion 20 is formed as a weak portion as a second modification of the first embodiment. That is, separation portion 20 is formed as a thin, tearable connecting portion. Otherwise, this modification of the first embodiment is the same as the first embodiment.

Figure 3:
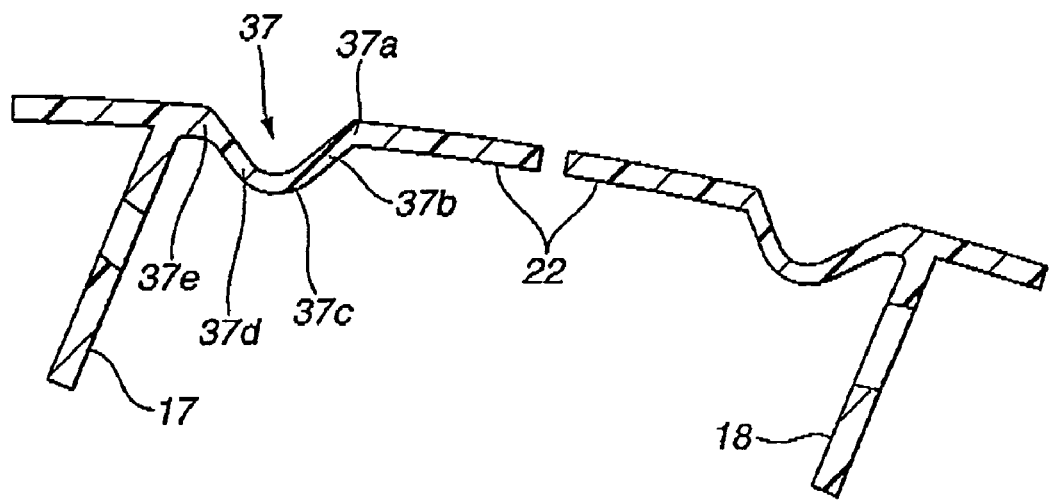
FIG. 3 is a cross sectional view of the backing member of FIG. 1.

Backing member 22 is explained with reference to FIG. 3. Hinge portion 37 comprises a door-side portion 37a, a first inclined portion 37b, a reflexing portion 37c, a second inclined portion 37d, and an attachment-side portion 37e. Hinge portion 37 is formed in a bent elbow shape, first inclined portion 37b being adjacent to reinforcement portion 33, and second inclined portion 37d being adjacent to inner surrounding portion 35. As explained, according to the first embodiment, hinge portion 37 comprises a front member under a front edge portion of door portion 26 and a back member is under a back edge portion of door portion 26. Hinge portion 37 can exist along one edge of door portion 26 in an instance where door portion 26 swings centered at only one edge thereof, or, along two different edges, as in a double-door arrangement, in an instance where door portion 26 comprises two portions which respectively swing from different edges.

Inflation behavior of air bag 9 will now be explained. Upon collision of a vehicle, gas is injected into air bag 9 from inflator 4. Air bag 9 expands inside of case 8, and due to the expansion force, door reinforcement portion 33 of backing member 22 and door portion 26 are pushed upward. Tear seam 24 formed in the shape of two adjoined rectangles then tears in advance of the front member and the back member of hinge portion 37, and door portion 26 opens as a double-door centered about hinge portion 37. As a result, tearing of door portion 26 is properly performed, and door portion 26 is torn away from instrument panel 1, that is, from covering portion 11.

Door portion 26, which has torn away from instrument panel 1, opens by swinging in a front direction and a back direction centered about hinge portion 37 of backing member 22, and an opening is formed in the portion from which door portion 26 has been severed. Air bag 9 then inflates from this opening into the vehicle interior to protect a passenger. During inflation of air bag 9, since hinge portion 37 of backing member 22 is a bent shape which includes first inclined portion 37b and second inclined portion 37d which are both straight-shaped flat portions, pushing and forcing of attachment-side portion 37e in the direction of attachment is portion 17,18 is prevented when door portion 26 is swinging outward to the outside of instrument panel 1, and as a result, an angle of attachment-side portion 37e relative to the surface of instrument panel 1 (angle θ shown in FIG. 4) is prevented from becoming an acute angle where hinge portion 37 is compressed in the direction of attachment portion 17, 18. Also, a circumferential length of hinge portion 37 is maintained, and bending deformation is not concentrated at points including door-side portion 37a, attachment-side portion 37e, and reflexing portion 37c which naturally have a bending point. Thus, referring to FIG. 6, since bending occurs easily at straight-shaped first inclined portion 37b and second inclined portion 37d, edges of door portion 26 do not contact with the surface of instrument panel 1 whereby movement of door portion 26 is limited, that is, the surface of instrument panel 1 does not interfere with door portion 26 and the edges of door portion 26 do not ride on instrument panel 1. Also, the edges of door portion 26 are above hinge portion 37 and therefore are prevented from contacting with air bag 9 by a bottom surface of hinge portion 37. Therefore, an opening for deployment and expansion of air bag 9 is secured, and smooth inflation of air bag 9 is promoted. No force acts on hinge portion 37 to pull hinge portion 37 outside, and localized bending and tensile force at attachment-side portion 37e is suppressed.

Figure 4:
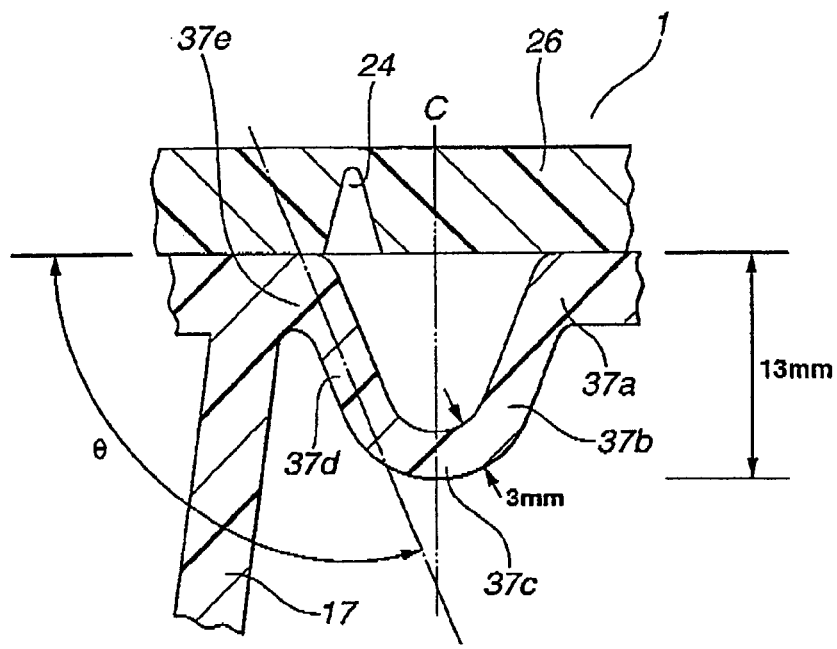
FIG. 4 is an enlarged cross-sectional view of a hinge is portion of the door portion and the backing member of FIG. 1.

According to the first embodiment, parts which are straight-shaped are first inclined portion 37b and second inclined portion 37d. Thus, without setting an inclination angle thereof at a right angle to the surface of instrument panel 1 which is adjacent to a base thereof, attachment-side portion 37e is previously formed with an obtuse angle so as to open outward toward tear seam 24. As shown in FIG. 4, the inclination angle is set to be larger than 100°. For best results, the inclination angle is set at from 120° to 150°, and preferably at from 125° to 145°. In the same manner, besides forming door-side portion 37a to be at a right angle as in the first embodiment, door-side portion 37a is set with an obtuse angle. Each inclination angle can be the same as or different from the other according to the first embodiment. A center of hinge portion 37 is indicated by an axis C. A maximum height of hinge portion 37 is limited to approximately 25 mm. If the height thereof exceeds this, hinge portion 37 will have an excessive circumferential length and intrude into the storage space of air bag 9. The height is appropriately determined according to the particular material used for backing member 22. Also, if the previously discussed inclination angle is too large, the inclination is a large obtuse angle and a distance between door-side portion 37a and attachment-side portion 37e of hinge portion 37 is too large, and it is also difficult to achieve a circumferential length for hinge portion 37. Therefore, the inclination angle is preferably 150° at most.

INFLATION EXPERIMENT I

Three instrument panels, i.e., cover bodies, with integrated air bag apparatuses were prepared according to the first embodiment of the present invention as shown in FIGS. 1 through 4 to serve as EXAMPLE I, EXAMPLE II, and EXAMPLE III. Each of the instrument panels was made from polypropylene and each of the backing members from thermoplastic polyolefin elastomer, having the physical properties shown in the table below. Instrument panels with integrated air bag apparatuses were prepared as examples of the related art for COMPARATIVE EXAMPLES I through VIII. The inflation experiment was performed at a room temperature of 23° C. Results from observation of the experiment are also presented in the table.

| | Instrument panel (PP) | | | | Backing member (TPO) | | | | |
|---|---|---|---|---|---|---|---|---|---|
| | flexual elastic modulus MPa | tensile strength MPa | Izod kJ/m² | elongation % | flexual elastic modulus MPa | tensile strength MPa | Izod kJ/m² | elongation % | Results of experiment |
| EXAMPLE I | 2,150 | 29.5 | 6.4 | 31 | 250 | 13 | 570 | NB | Smooth inflation with inflation shape as designed. |
| EXAMPLE II | 2,760 | 30.7 | 5.4 | 25 | " | " | " | " | Same as above. |
| EXAMPLE III | 2,970 | 25.0 | 4.0 | 350 | " | " | " | " | Same as above. |
| COMP. EX. I | 3,780 | 32.0 | 4.7 | 18 | " | " | " | " | Tears outside tear seam, bag does not form planned inflation shape. Break-away fragments. |
| COMP. EX. II | 1,270 | 19.6 | 3.2 | 10 | " | " | " | " | Deforms under load, appearance-affecting pocket wave formed. |
| COMP. EX. III | 3,220 | 42.0 | 4.3 | 14 | " | " | " | " | Inflation timing late. |
| COMP. EX. IV | 2,350 | 15.6 | 3.2 | 50 | " | " | " | " | Tears outside tear seam, bag does not form planned inflation shape. Break-away fragments. Inflation timing early. |
| COMP. EX. V | 2,220 | 15.8 | 14.7 | 360 | " | " | " | " | Tears outside tear seam, bag does not form planned inflation shape. Inflation timing early. |
| COMP. EX. VI | 2,460 | 26.8 | 17.4 | 70 | " | " | " | " | Inflation timing late. |
| COMP. EX. VII | 3,420 | 36.0 | 2.8 | 6 | " | " | " | " | Tears outside tear seam, bag does not form planned inflation shape. Break-away fragments. |
| COMP. EX. VIII | 2,570 | 24.0 | 5.1 | 500 | " | " | " | " | Inflation timing late. |

INFLATION EXPERIMENT II

Figure 26A:
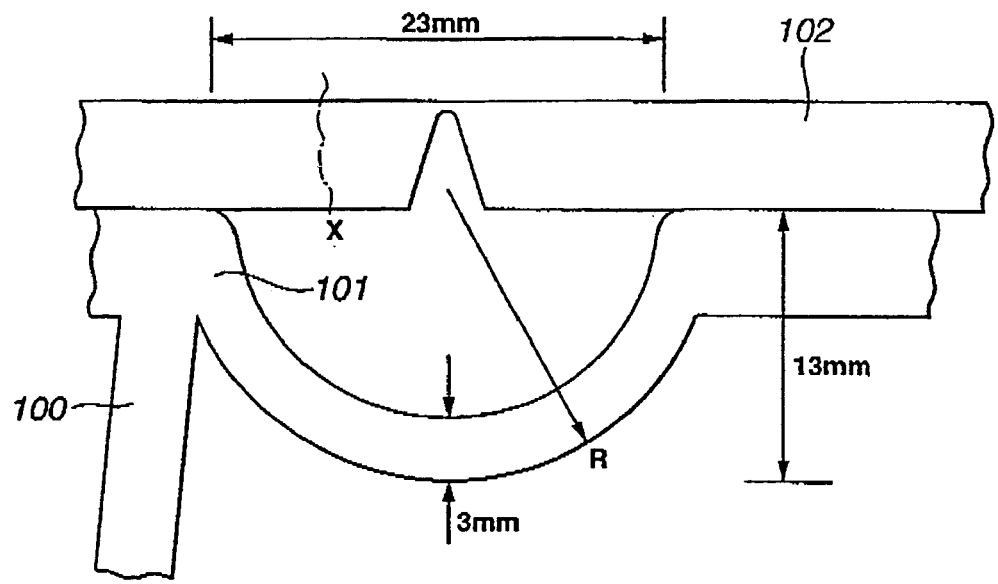
FIG. 26A is a cross-sectional view of a hinge portion according to the related art showing development of a crack.

An instrument panel having an integrated air bag apparatus is constructed to serve as COMPARATIVE EXAMPLE IX representative of the related art, a hinge size thereof being of comparable largeness to EXAMPLE I, however, other than a shape in cross-section thereof being a bent shape with no flat portion, a hinge thereof is the same that of EXAMPLE I, as shown in FIG. 26A. Inflation of COMPARATIVE EXAMPLE IX was observed during an inflation experiment performed at a low temperature of minus 30° C.

Figure 26B:
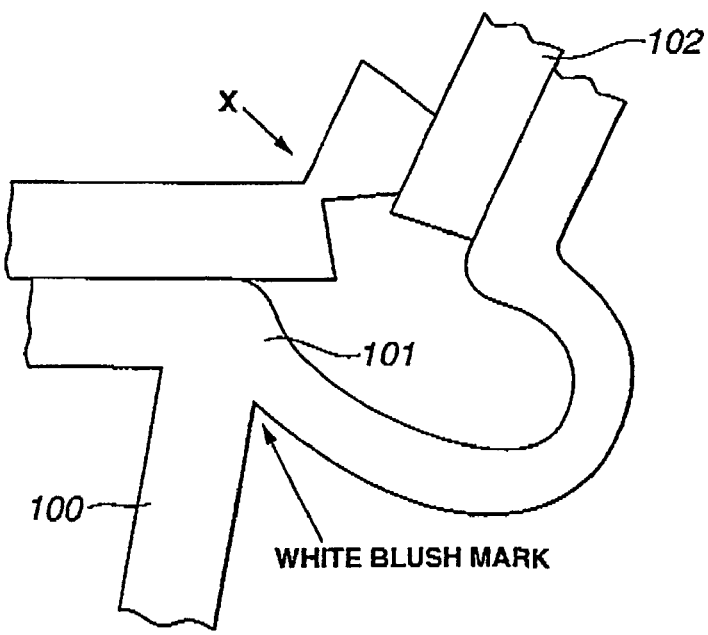
FIG. 26B is a cross-sectional view of the hinge portion of FIG. 26A after expansion of an airbag showing a damaged portion resulting from the crack.

Results of the inflation experiment show that although the air bag of COMPARATIVE EXAMPLE IX inflated into a predetermined shape, stress evidenced by white blush marks at many locations occurred in the attachment-side portion of the hinge, and a crack designated by X formed in proximity to the tear seam. Partial breaking occurred in the instrument panel where the crack had formed, shown in FIG. 26B.

In contrast, with EXAMPLE IV which used the same arrangement of EXAMPLE I, the door portion in the surface of instrument panel 1 swung with favorable characteristics despite a low temperature of minus 30° C., and there was no interference in the inflation of the air bag. Hinge portion 37 was free from white blush marks produced by stress, damage, or other adverse effects. Also, there was no cracking or fragmentation in instrument panel 1.

A second embodiment according to the present invention will now be explained. Reference numbering will be maintained for elements in common with the first embodiment, and explanation of common elements has been abbreviated.

Referring to FIGS. 10 through 17, tear seam 24 comprises a first tear groove 24a. Separation portion 20 is formed in an H-shape in a portion of backing member 22 which directly covers or corresponds to first tear groove 24a. That is, separation portion 20 is formed in a portion of backing member 22 other than a portion corresponding to a front edge portion and a back edge portion of first tear groove 24a. Separation portion 20 is formed as a slit-shape of small width. A portion of backing member 22 which directly covers the front edge portion and back edge portion of first tear groove 24a is hinge portion 37 which is a bent shape and is disposed astride first tear groove 24a. As shown in FIG. 11A, hinge portion 37 and first tear groove 24a are relatively aligned to form an off-center distance L1 between a hinge center 37f of hinge portion 37 and a groove center of first tear groove 24a, off-center distance L1 being formed from 5 to 15 mm in the front and back direction of the surface of instrument panel 1. Hinge portion 37 and first tear groove 24a thus have a relative off-center alignment in the surface direction.

Figure 10:
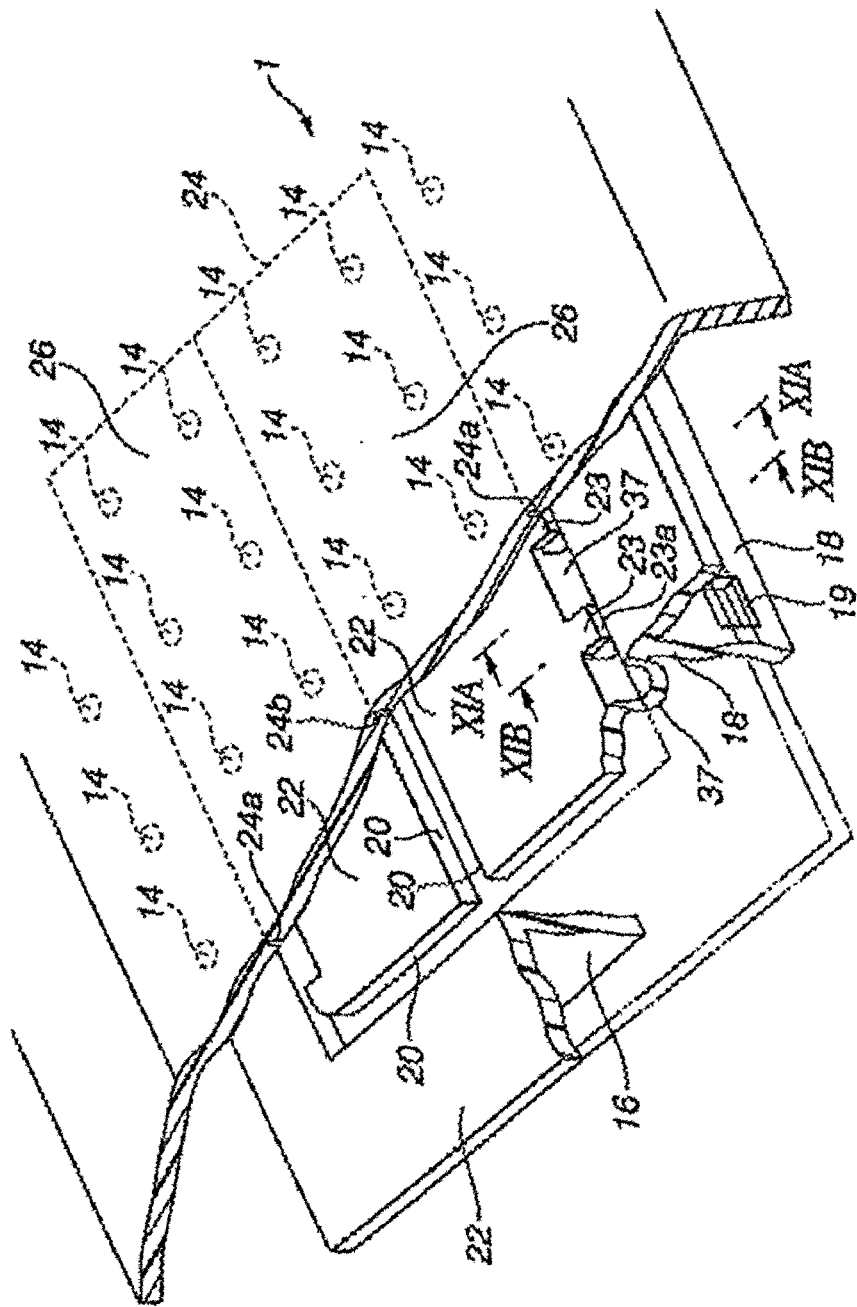
FIG. 10 is a perspective view of the instrument panel and backing member of FIG. 1 showing door reinforcing portions according to a second embodiment of the present invention.
Figure 11A:
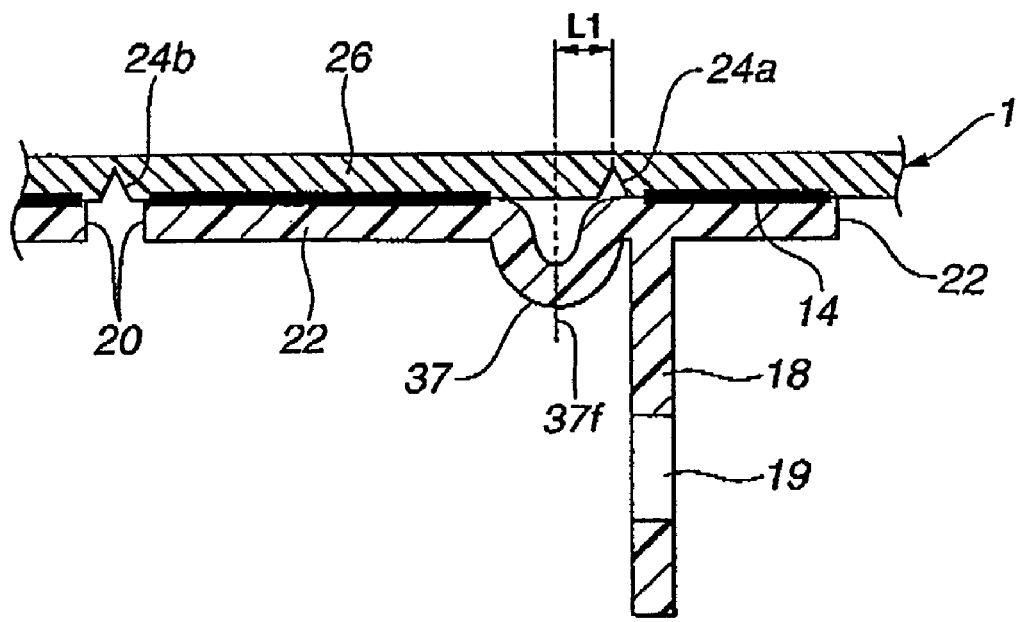
FIG. 11A is a cross-sectional view of the instrument panel and backing member of FIG. 10 taken along the line XI A—XI A.
Figure 11B:
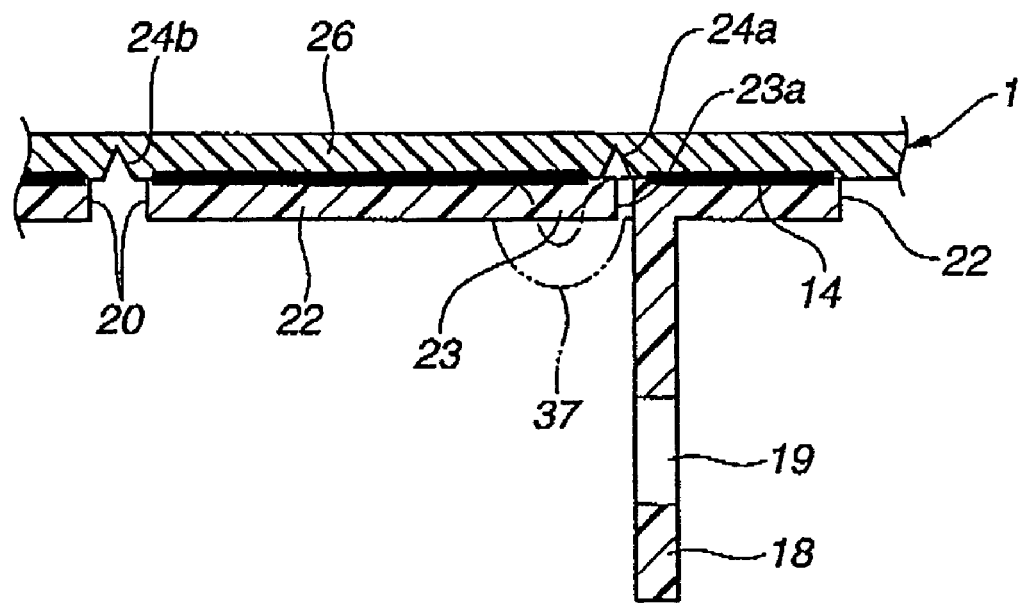
FIG. 11B is a cross-sectional view of the instrument panel and backing member of FIG. 10 taken along the line XI B—XI B.

Backing member 22 is larger in size than door portion 26, and a plurality of joining points 14 are formed both within the loop of tear seam 24 and beyond the loop of tear seam 24, as shown in FIGS. 10 to 11B. Therefore, a portion of joining points 14 exist on door portion 26, and a portion of joining points 14 exist on a portion of backing portion 22 not including door portion 26. Joining points 14 are formed by ultrasonic welding, and work into or sink into instrument panel 1 from backing member 22, such that the boundary surface between instrument panel 1 and backing member 22 takes on a waved shape. Joining strength between the synthetic resin bodies is thereby increased.

According to the second embodiment of the present invention, hinge portion 37, 37 is formed in a U-shape in cross-section, and is formed intermittently in a plurality of portions in a left and right direction along and under first tear groove 24a, a pair of facing edge portions existing between each portion of hinge portion 37, 37 comprised of a reinforcement edge portion and a surrounding edge portion. As shown in FIG. 11B, an extended supporting portion 23, 23 extends from one of the pair of facing edge portions existing between each portion of hinge portion 37, 37 toward attachment portion 17, 18 of backing member 22, and a free end portion 23a of extended supporting portion 23, 23 comes in proximity to attachment portion 17, 18. In a first modification of the second embodiment, extended supporting portion 23, 23 is formed as a pair of opposing members, each member of which extending from either of the two facing edge portions existing between each portion of hinge portion 37, 37, a free end portion 23a of each member being in mutual proximity as well as mutually facing.

Upon collision of a vehicle, air bag 9 expands inside case 8, and both door portion 26 as well as a portion of backing member 22 behind door portion 26 are pushed upward by the force of expansion. During inflation, since a second tear groove 24b which bridges both left and right sides of first tear groove 24a is not covered by backing member 22, the expansion force of air bag 9 is directly applied thereto and second tear groove 24b easily tears. Also, by the groove center of both the front edge portion and the back edge portion of first tear groove 24a being aligned off-center in the front and back direction with respect to hinge center 37f of hinge portion 37, although first tear groove 24a is covered by extended supporting portion 23, 23 of backing member 22, extended supporting portion 23, 23 flexibly deforms with the expansion force of air bag 9 since backing member 22 is made of soft synthetic resin, and the expansion force acts on corresponding portions of first tear groove 24a. Accordingly, even with normal-output inflator 4, first tear groove 24a and second tear groove 24b tear properly, and door portion is torn free from instrument panel 1, that is, from covering portion 11.

Moreover, according to the second embodiment, attachment portion 17, 18 is in proximity to first tear groove 24a, and therefore air bag 9 is restricted to upward movement toward first tear groove 24a by attachment portion 17, 18. Thus, the expansion force of air bag 9 is concentrated at first tear groove 24a. As a result, further conditions are provided which facilitate tearing of door portion 26.

Since each portion of hinge portion 37, 37 is U-shaped in cross section, each portion easily bends when door portion 26 opens. Also, extended supporting portion 23, 23 is disposed between each portion of hinge portion 37, 37 formed intermittently along first tear groove 24a. Extended supporting portion 23, 23 extends from one of the facing edge portions existing between each hinge portion 37, 37, and when door portion 26 opens, free end portion 23a of extended supporting portion 23, 23 hits or contacts the other facing edge portion, and door portion 26 bends without falling inward. Also, according to the previously described first modification of the second embodiment where extended supporting portion 23, 23 extends from each of the facing edge portions between each hinge portion 37, 37, and each free end portion 23a of extending supporting portion 23, 23 are in mutual proximity, each free end portion 23a mutually hits or contacts when door portion 26 opens, and bending occurs from there without door portion 26 falling inward.

Door portion 26, which has been torn free from instrument panel 1, swings open in fore and aft directions centered about hinge portion 37 of backing member 22, and from the opening formed by severed door portion 26, air bag 9 expands into the vehicle interior to protect a passenger.

Smooth expansion during inflation is promoted when air bag 9 contacts the curved surface of hinge portion 37, 37.

Figure 12:
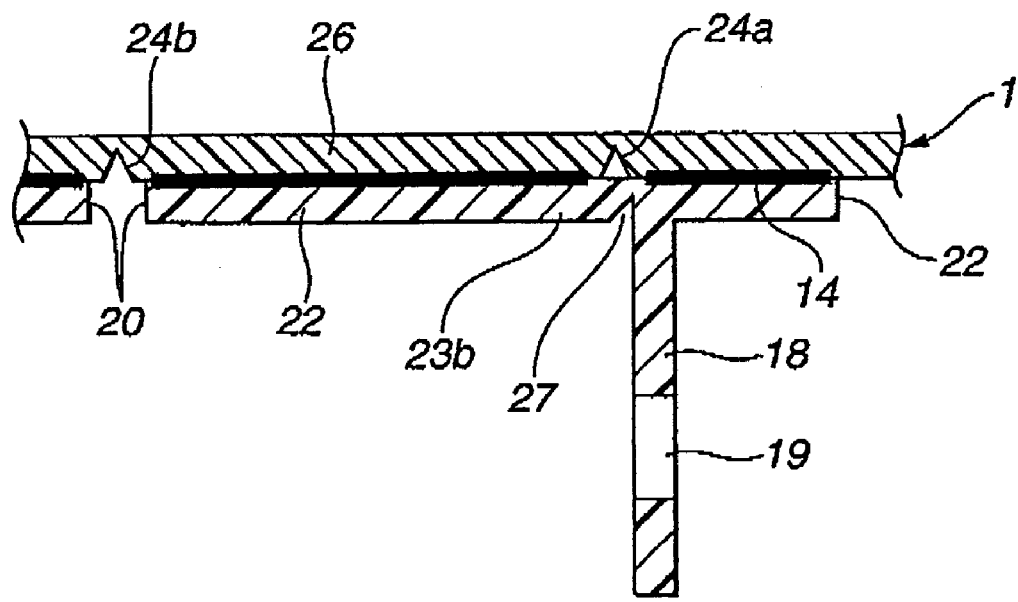
FIG. 12 is a cross-sectional view of the instrument panel and backing member of FIG. 10 showing a second modification thereof.

A second modification of the second embodiment will be explained with reference to FIG. 12. An extended supporting portion 23b of backing member 22 is formed the same as extended supporting portion 23 of the second embodiment, except that extended supporting portion 23b is joined to attachment portion 17, 18 (only one facing portion thereof is shown) by a thinned portion 27. Thinned portion 27 of extended supporting portion 23b covers a corresponding portion of first-tear groove 24a from directly beneath. However, since thinned portion 27 also flexibly deforms, the corresponding portion of first tear groove 24a properly tears. Otherwise, this modification of the second embodiment is the same as the second embodiment.

Figure 13:
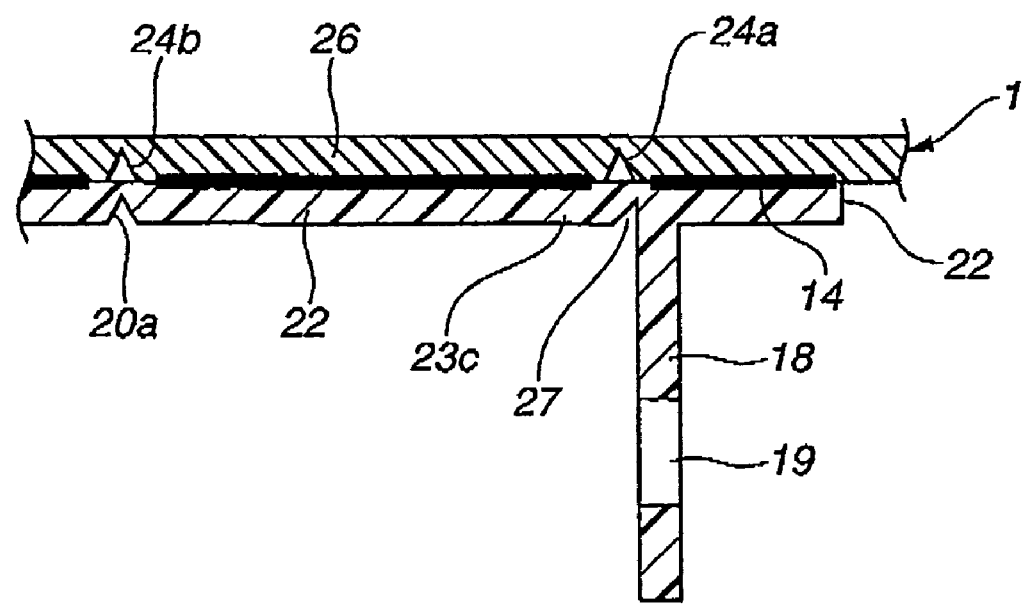
FIG. 13 is a cross-sectional view of the instrument panel and backing member of FIG. 10 showing a third modification thereof.

A third modification of the second embodiment will be explained referring to FIG. 13. An extended supporting portion 23c of backing member 22 is joined to attachment portion 17, 18 (only one facing portion thereof is shown) by thinned portion 27. Thinned portion 27 covers a corresponding portion of first tear groove 24a from directly beneath, however, the corresponding portion of first tear groove 24a properly tears since thinned portion 27 flexibly deforms. In this third modification, a middle thinned portion 20a is formed in backing member 22 and covers second tear groove 24b from beneath. Since middle thinned portion 20a flexibly deforms, the corresponding portion of second tear groove 24b tears properly. Otherwise, this modification of the second embodiment is the same as the second embodiment.

Figure 14:
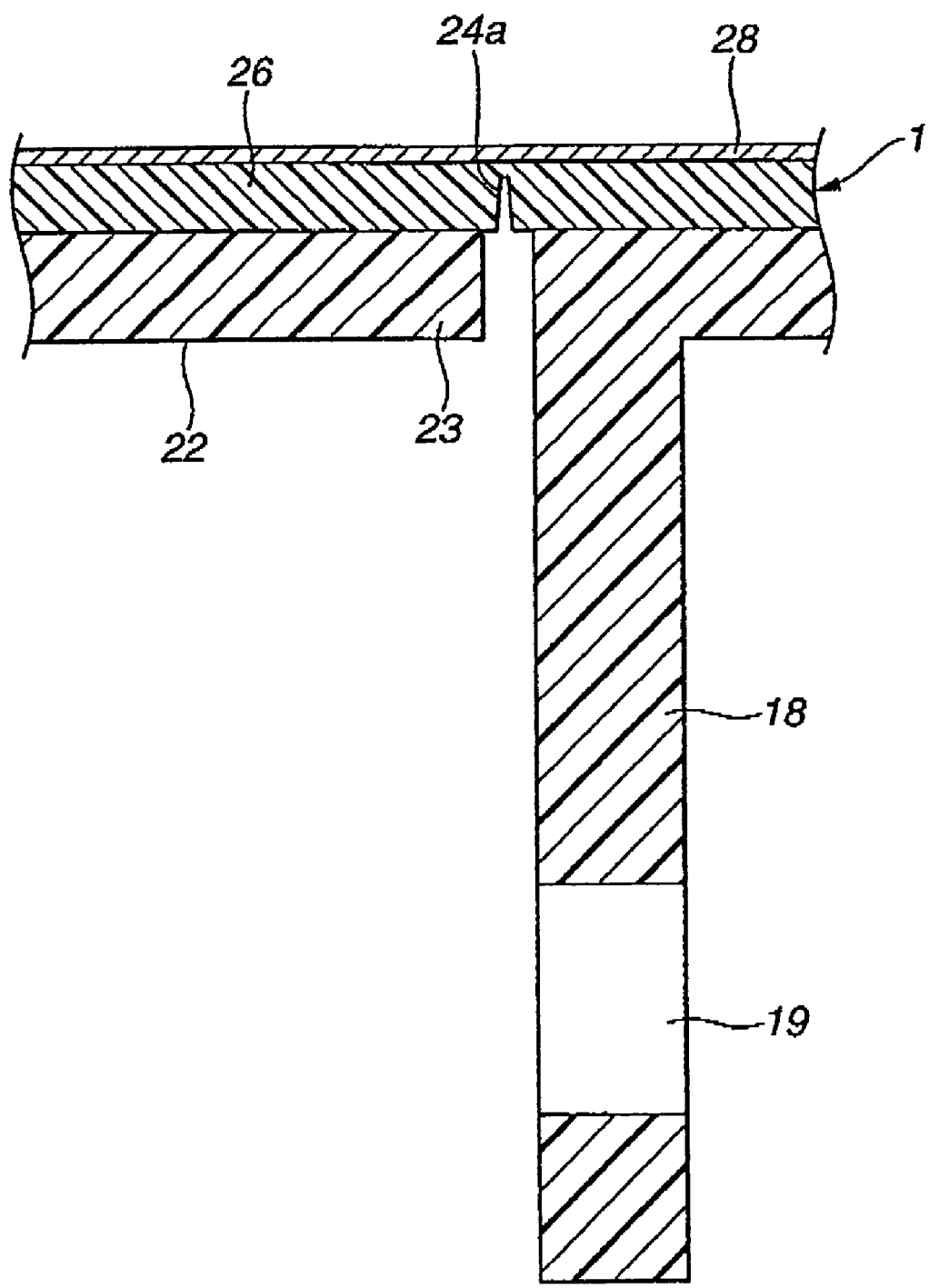
FIG. 14 is a cross-sectional view of the instrument panel and backing member of FIG. 10 showing a fourth modification thereof.

Referring to FIG. 14, a fourth modification of the second embodiment will be explained. Backing member 22 is the same as that of the second embodiment. A cover layer 28, which is thin and made from TPO resin given a leather-like texture finish, covers instrument panel 1 including door portion 26. Cover layer 28 is also therefore above first tear groove 24a. Otherwise, this modification of the second embodiment is the same as the second embodiment.

Figure 15:
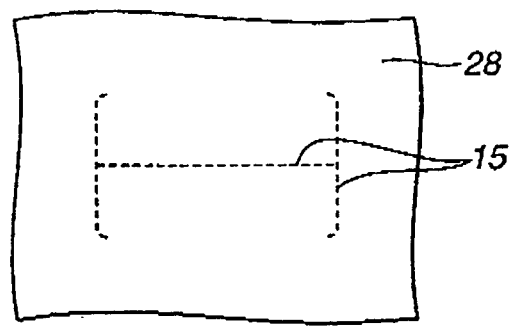
FIG. 15 is a plan view of the instrument panel of FIG. 10 showing a pattern of individual holes in a cover layer.
Figure 16:
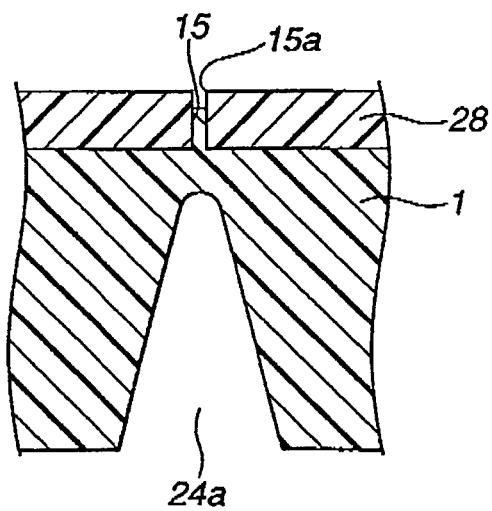
FIG. 16 is an enlarged cross-sectional view of the tear seam of the instrument panel of FIG. 15.
Figure 17:
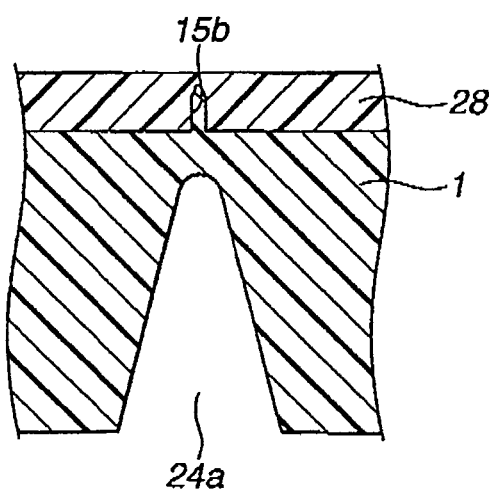
FIG. 17 is an enlarged cross-sectional view of the tear seam of the instrument panel of FIG. 15 showing a fifth modification thereof.

Referring to FIGS. 15, 16, and 17, cover layer 28 covers the surface of instrument panel 1 including the surface of covering portion 11. Cover layer 28 is a soft resin sheet having a thickness approximately from 0.3 to 1.5 mm. Before joining cover layer 28 with instrument panel 1, a plurality of holes 15 are formed along a portion thereof as a perforation portion to match with first tear groove 24a to be formed in the back surface of instrument panel 1 during after-processing. Holes 15 are formed as open holes which are thus open at both an outer and an inner surface of cover layer 28.

A diameter of each hole of holes 15 is from 0.05 to 2.0 mm, preferably from 0.2 to 0.3 mm, and a pitch between each hole is from 0.1 to 5.0 mm, preferably from 0.5 to 1.0 mm. Holes 15 are formed with a hole-forming tool having a plurality of projections which match with the diameter and pitch of holes 15 such as a machining blade or needle, or laser.

Next, the method of making instrument panel 1 and cover layer 28 as well as operation thereof during use will be explained.

A soft resin sheet is first cut with a predetermined size to serve as cover-layer 28, and holes 15 are formed therein at a location which matches with tear seam 24 which is formed in the back surface of instrument panel 1. Holes 15 are formed along tear seam 24 so as to form an H-shape in cover layer 28 as shown in FIG. 15. Holes 15 are formed within the diameter and pitch ranges specified above.

After cover layer 28 has been thus formed, cover layer 28 is inserted in a predetermined position in a mold for injection molding of an instrument panel, and instrument panel 1 is formed by injection molding.

During injection molding, resin injected into the cavity of the mold is formed in a predetermined shape while flowing inside the cavity along the back side of cover layer 28. A part of the resin also flows into holes 15 previously formed in cover layer 28.

However, the flow of resin into holes 15 is restricted to as far as opening portion 15a which is an end of holes 15 at the outside surface of cover layer 28. Restriction of flow is caused by a flow regulating effect which occurs naturally from the aforementioned predetermined dimensions of holes 15, and also by the pressure of gas built up in holes 15 and packed by the opposing mold surface, as well as by the pressure of gas emitted by resin melt during the injection process. As shown in FIG. 16, flow of resin is stopped just before the outer edge of opening portion 11a.

Once the injection molding of instrument panel 1 has been completed, instrument panel 1 is left to cure. Joined instrument panel 1 including covering portion 11 and cover layer 28 are then removed from the mold as an integral structure with the surface of instrument panel 1 being covered by cover layer 28. Also, a portion of holes 15 not all the way to opening portion 15a thereof is sealed by a portion of the rigid resin which forms instrument panel 1, a large portion of holes 15 thus being in a solid condition due to the rigid resin, and problems including swelling due to pressure of resin during the formation process do not occur.

The rigid resin is rated with a melt flow rate of from 10 to 30 (JIS K-7210), preferably in a range centered around 15. According to this embodiment, grade HIP145 MFR14.2 (Grand Polymer Co., Ltd.) was used, which is a polypropylene (polypropylene composite, PPC) containing talc.

Once air bag 9 starts to expand, door portion 26 is pushed open by the force of expansion centered on hinge portion 37. Therefore, tear seam 24 formed in instrument panel 1 which covers backing member 22 tears substantially in an H-shape, cover layer 28 thereby also being torn along tear seam 24 due to holes 11 formed therein. Thus, even in an instance where a material which is relatively difficult to tear is used for cover layer 28, cover layer 28 tears properly in a predetermined shape.

Referring to FIG. 17, a fifth modification of the second embodiment is shown. In this modification, each hole of holes 15 is formed in cover layer 28 as blind holes 15b, and thus are open only at an end thereof in the inner surface of cover layer 28. Resin flowing into blind holes 15b seals in air pre-existing in blind holes 15b as well as gas which is emitted from the very melting resin, and therefore, since pressing pressure of resin is not directly applied to a bottom of blind holes 15b, swelling does not occur in the surface of cover layer 28 at portions thereof directly over blind holes 15b during cooling and hardening of the resin.

According to this fifth modification, sink marks resulting from formation of first tear groove 24a and second tear groove 24b is covered and concealed. Otherwise, this modification of the second embodiment is the same as the second embodiment.

By providing extended supporting portion 23 between intermittently formed hinge portion 37, support is provided where there is otherwise space existing between portions of hinge portion 37, it is not necessary for covering portion 11 to possess a high impact resistance which is otherwise normally required in an instrument panel, and thus a cost reduction is realizable. Also, tearing at portions other than tear seam 24 is prevented.

A third embodiment according to the present invention will be explained with reference to FIGS. 18 to 22. Reference numerals are maintained for elements in common with the previous embodiments. Explanation of some elements in common with the previous embodiments will be found.

Backing member 22 is formed as a single and integral body which comprises inner surrounding portion 35 which is a square plate frame member fixed to a back side of outer surrounding portion 25 of instrument panel 1, attachment portion 17, 18 which comprises a front facing portion and a back facing portion which form a square tube shape projecting downward from an edge portion of an inner circumference of inner surrounding portion 35, a door reinforcement portion 33, 33 which comprises a pair of square plate shape members, each being fixed to a back side of one of two members of door portion 26, 26 and thus located within the inner circumference of inner surrounding portion 35, hinge portion 37, 37 which comprises a plurality of portions which joins door reinforcement portion 33, 33 to the front and back portions of attachment portion 17, 18, extended supporting portion 23 which is formed between each portion of hinge portion 37, 37 and extends from door reinforcement portion 33, 33 toward attachment portion 17, 18, and a joining portion 70 which serves as a connection between extended supporting portion 23 and attachment portion 17, 18. Inner surrounding portion 35 and attachment portion 17, 18 constitute a surrounding base 34. Also, separation portion 20 is formed as a concave groove having a small width between each member of door reinforcement portion 33, 33, as well as along both short edge portions on both sides of door reinforcement portion 33, 33. That is, separation portion 20 is formed in a substantial H-shape along a position facing the short edge portions of first tear groove 24a as well as facing second tear groove 24b in a middle of door portion 26, 26.

Figure 18:
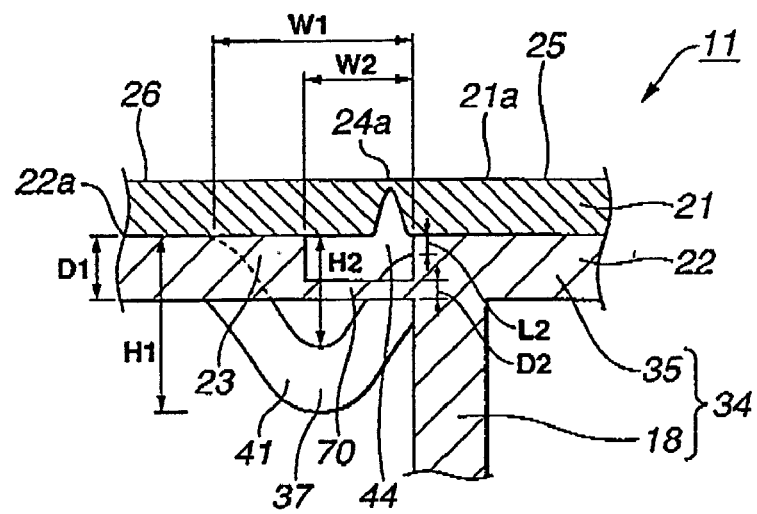
FIG. 18 is an enlarged cross-sectional view of the instrument panel and the backing member showing a joining portion extending from an extended supporting portion according to a third embodiment of the present invention.

Each portion of hinge portion 37, 37 is deformable, and is flexible according to the third embodiment. According to the third embodiment, hinge portion 37, 37 comprises a plurality of portions, for example, 5 portions, which are disposed at predetermined intervals along a position facing a portion of tear seam 24, according to the third embodiment, along a position facing a front groove portion and a rear groove portion of first tear groove 24a located respectively at a front and back of door portion 26, 26. Hinge portion 37, 37 is not limited to comprising 5 portions nor to the manner in which hinge portion 37, 37 is deformable. The portions of hinge portion 37, 37 are disposed astride first tear groove 24a, and flexibly connect each member of door reinforcement portion 33, 33 with attachment portion 17, 18, that is, each member of door reinforcement portion 33, 33 with surrounding base 34. As shown in FIG. 18, one end of hinge portion 37, 37 joins with door reinforcement portion 33, 33, and another end thereof joins with attachment portion 17, 18, and a curved portion 41 is provided in a downward-projecting manner, such that hinge portion 37, 37 projects or bulges downward, curved portion 41 being arcuate in cross-section, and further, are U-shaped or V-shaped in cross-section.

Further, extended supporting portion 23 is disposed to be in proximity to hinge portion 37, 37, and according to the third embodiment, is disposed between adjacent portions of hinge portion 37, 37, as well as at the front groove portion and the rear groove portion of first tear groove 24a, and extends from door reinforcement portion 33, 33 toward attachment portion 17, 18 as a square flat-shaped tongue. Each extended supporting portion 23 is fixed along with door reinforcement portion 33, 33 through a process such as vibration welding to a back side of door portion 26 of instrument panel 1, and adds to the joining strength between backing member 22 and instrument panel 1 by adding additional joining surface area.

Joining portion 70, which serves as a connecting member between extended supporting portion 23 and attachment portion 17, 18, is projectingly disposed on a lower edge of an edge portion of extended supporting portion 23, that is, along a position distanced from instrument panel 1, in a square flat shape. Joining portion 70 is significantly thinner than extended supporting portion 23, being designed to tear during inflation of air bag 9.

Further, according to the third embodiment, extended supporting portion 23 and curved portion 41 of hinge portion 37, 37 share a thickness D1 of 3.0 mm, which is the same as a shared thickness of inner surrounding portion 35 of backing member 22 and door reinforcement portion 33, 33. Also, joining portion 70 is formed with a set thickness D2 of 1.5 mm. Also, a height L2 of a space portion 44 is set at 2.5 mm, space portion 44 existing between an inner surface of instrument panel 1, i.e., an inner surface of covering portion 11, and a location on attachment portion 17, 18 distanced from instrument panel 1 where hinge portion 37, 37 is joined.

Further, a depth H1 from a top-side surface of door reinforcement portion 33 of backing member 22 to an bottom-side surface of a lowermost end of hinge portion 37, 37 is 12.5 mm, a depth H2 from the top-side surface of door reinforcement portion 33 to a top-side surface of a lowermost end of hinge portion 37 is 10.0 mm, an outer width W1 of a concave portion formed by curved portion 41 at an top-side surface of backing member 22, that is, a combined length of extended supporting portion 23 and joining portion 70, is 16.5 mm, and a width W2 which is a length of joining portion 70 is 4.8 mm. Further, dimensions of each element, such as height L2 of space portion 44, are determined upon consideration of is various factors including characteristics of resin used, size of air bag 9, i.e., volume and shape, gas injection characteristics and specifications of inflator 4, as well as upon consideration of results of inflation testing of air bag apparatus 3.

Next, operation of instrument panel 1 with integrated air bag apparatus 3 will be explained.

Gas is injected into air bag 9 which then inflates inside case 8. Inflation force of air bag 9 works through door reinforcement portion 33 of backing member 22 to force door portion 26 of instrument panel 1 to bulge. During inflation, as shown by the solid line in FIG. 19, in addition to hinge portion 37, 37, joining portion 70 is also joined to door portion 26, 26 at a portion thereof along first tear groove 24a and functions to control the range of movement of door portion 26, 26, such that each member of door portion 26, 26 swings open in a direction indicated by Fb and Fc respectively. Inflation force of air bag 9 forces separation portion 20 and tear seam 24 from second tear groove 24b to tear, and further, tear seam 24 tears along an entire length thereof, and door portion 26, 26 is torn free from remaining portions of instrument panel 1, to form a freed door portion which includes door portion 26, 26. Tearing of joining portion 70 occurs at a point in time from before to after formation of the freed door portion, and each member of the freed door portion swings with hinge portion 37 serving as a support, and an opening for air bag 9 to inflate through is formed.

Thus, according to the third embodiment, tearable joining portion 70 is disposed in proximity to hinge portion 37 of backing member 22, and door portion 26 and surrounding is base 34 are connected with joining portion 70. Therefore, behavior of door portion 26 is regulated during the initial expansion stage by joining portion 70, and door portion 26 and the freed door portion are formed with desirable characteristics.

That is, according to the third embodiment, since joining portion 70 and hinge portion 37 are disposed along first tear groove 24a, upward bulging and tearing are controlled where hinge portion 37 is disposed by joining portion 70, and tearing of tear seam 24 at locations other than where hinge portion 37 is disposed occurs first, and swinging movement of door portion 26 and the entire freed door portion are promoted, and, door portion 26 and the entire freed door portion swing open with stable characteristics with disregard for changes in resin characteristics due to temperature changes.

Figure 19:
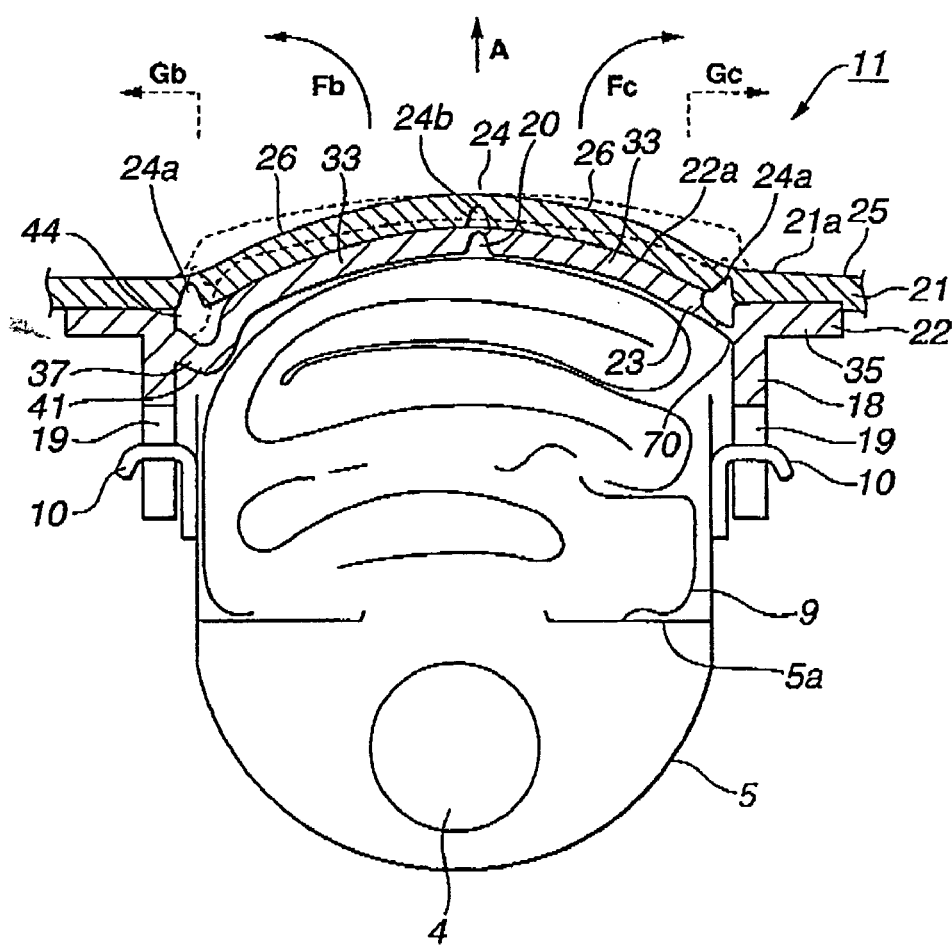
FIG. 19 is a cross-sectional view of the instrument panel and air bag apparatus taken along the line XIX-O—O-XIX of FIG. 21.
Figure 20:
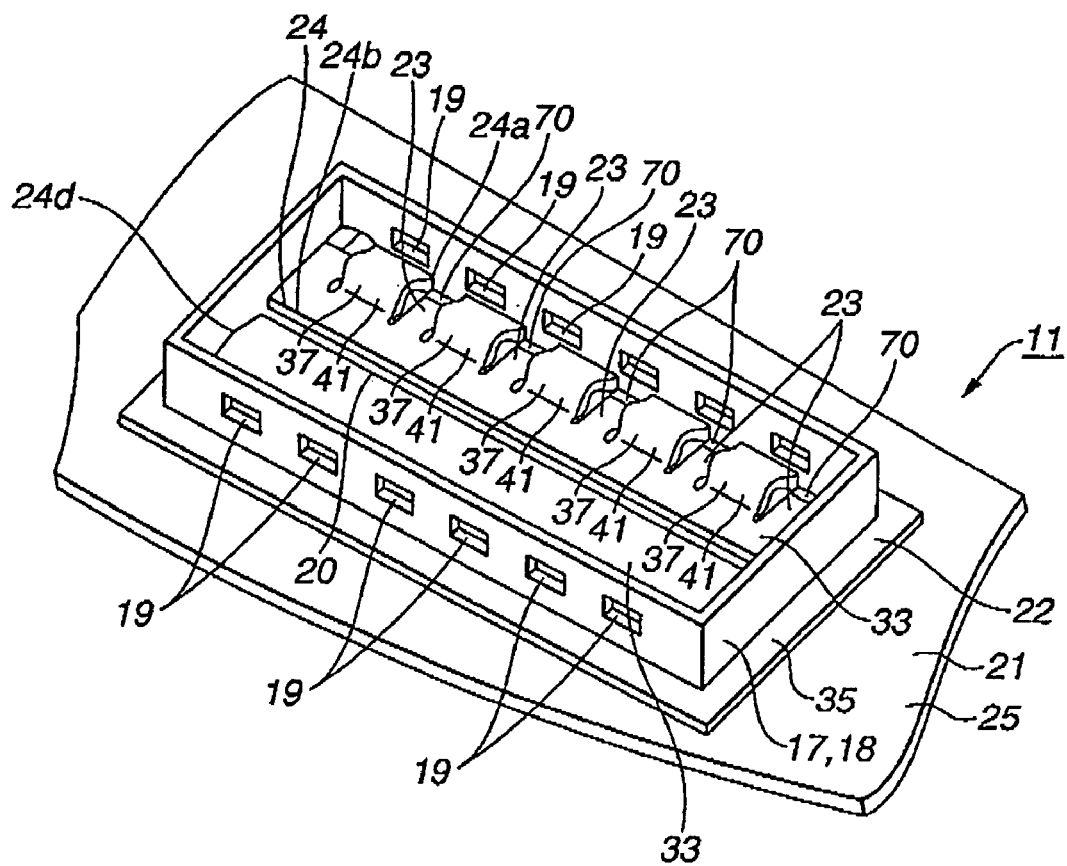
FIG. 20 is a perspective bottom view of the instrument panel and backing member of FIG. 18.
Figure 21:
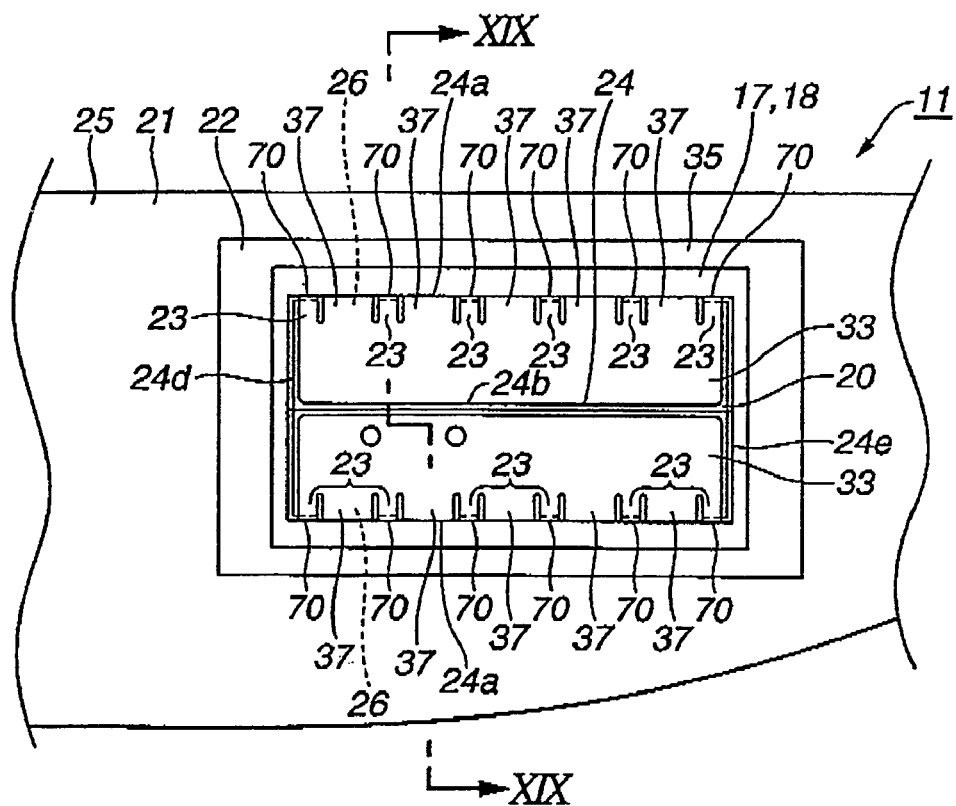
FIG. 21 is a bottom view of the instrument panel and backing member of FIG. 18.
Figure 22:
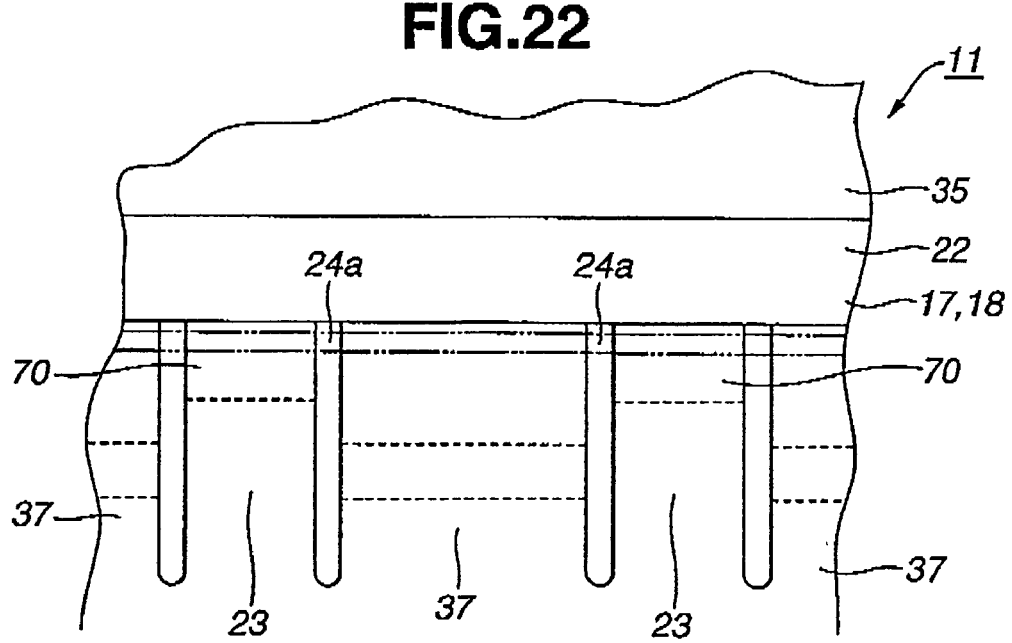
FIG. 22 is an enlarged portional view of FIG. 21.

If joining portion 70 were not provided, then in a high temperature range such as at temperatures in excess of 100° C., the entirety of door portion 26, 26 bulges upward in the direction indicated by arrow A during expansion of air bag 9, and second tear groove 24b as well as the remainder of tear seam 24 tear all at once, after which door portion 26, 26 may behave in a crank-like manner where the members of door portion 26, 26 move in a lateral direction in parallel as indicated by the broken-line arrows Gb and Gc in FIG. 19. The freed door portion has an edge portion formed by tearing at portions including the front groove portion and the rear groove portion of first tear groove 24a, the edge portion being where the freed door portion is joined by hinge portion 70, and in such an instance where joining portion 70 is not provided, the edge of the freed door portion moves into a position where movement thereof is limited while rubbing with an outer surface 21a of instrument panel 1, and door portion 26, 26 is pushed upward in the direction of arrow A while outer surface 21a interferes with movement thereof and prevents any further movement sideways thereof, and a large amount of force may come to act at locations including a joining face 22a of instrument panel 1 and backing member 22 and hinge portion 37. In contrast, according to the third embodiment, the edge formed by tearing at portions including the front groove portion and rear groove portion of first tear groove 24a suppresses interference with outer surface 21a of instrument panel 1, and desired characteristics are stably maintained.

Also, joining portion 70 is disposed on backing member 22, and tearing characteristics of the front groove portion and the rear groove portion of first tear groove 24a facing hinge portion 37, 37 are formed equally with other portions of tear seam 24. Therefore, during inflation of air bag 9, the front groove portion and the rear groove portion of first tear groove 24a tears in the same rapid manner. Thus, during the initial inflation stage, the edge of the freed door portion formed by tearing of the front groove portion and the rear groove portion of first tear groove 24a is smoothly pulled into space portion 44, and interference between the edge of the freed door portion and outer surface 21a of instrument panel 1 is suppressed. Further, since tear seam 24 which includes first tear groove 24a does not need to be designed with a special shape, a shape of the edge of the freed door portion is easily made to be smooth.

Therefore, air bag 9 is maintained with desirable characteristics to enable smooth inflation thereof, whether in a low temperature range or a high temperature range. Air bag 9 also has both favorable movement during inflation and a favorable outer appearance. A favorable structure is thus provided for air bag apparatus 3 formed integrally with instrument panel 1.

Also, according to the third embodiment, since hinge portion 37 comprising several portions is disposed astride tear seam 24 along a portion where door reinforcement portion 33 and surrounding base 34 mutually face, and joining portion 70 is disposed between adjacent portions of hinge portion 37, 37, along a predetermined portion, that is, along the front groove portion and the rear groove portion of first tear groove 24a, support is provided by hinge portion 37 while upward bulging is suppressed, and desired swinging movement is thereby realized.

Further, according to the third embodiment, since extended supporting portion 23 extends from door reinforcement portion 33, 33 between portions of hinge portion 37, by joining extended supporting portion 23 along with door reinforcement portion 33 to door portion 26, 26, joining surface area is increased, and a single, reinforced body is achieved as far as a position in proximity to surrounding base 34, thereby increasing rigidity. Further, it is only necessary for joining portion 70 to connect across a very small space, and thus joining portion 70 can be designed with a small length, and therefore upward bulging of door portion 26, 26 is effectively suppressed, and door portion 26, 26 opens with a favorable motion.

Also, according to the third embodiment, a height of an upper surface of hinge portion 37, 37 at a base portion thereof joined to attachment portion 17, 18 is set at a position lower than a height of an upper surface of both inner surrounding portion 35 and door reinforcement portion 33, 33, space portion 44 being thereby formed between instrument panel 1 and backing member 22, therefore, the freed door portion swings with a low-positioned point of support, that is, the edge of the freed door portion formed by tearing of tear seam 24 swings so as to be pulled downward into space portion 44, and further, the edge of the freed door portion is pulled into a space formed by curved portion 41 of hinge portion 37, 37, and is thereby enabled to swing smoothly.

Further, it is not necessary for joining portion 70 to be disposed at both the front groove portion and the rear groove portion of first tear groove 24a. As a first modification of the third embodiment, joining portion 70 is formed only at the rear groove portion, that is, a portion of first tear groove 24a nearest a passenger. Otherwise, this modification of the third embodiment is the same as the third embodiment.

Also, a shape of joining portion 70 does not necessarily need to be formed in a flat plate shape, and can be any shape which allows joining portion 70 to act as a regulating member which regulates movement to a predetermined position, and constitutes a point of pivot for swinging during the initial inflation stage.

Further, joining portion 70 is formed to be tearable, and tears during inflation of air bag 9 as previously explained, however, depending on conditions, for example, under high temperatures, joining portion 70 may be formed as a structure which allows smooth formation of door portion 26 and the freed door portion without tearing. Also, as a second modification of the third embodiment, joining portion 70 is designed such that under certain temperature conditions, only a predetermined number of the portions which constitute joining portion 70 tear and the remainder thereof are left untorn, as opposed to allowing all of joining portion 70 to tear. Otherwise, this modification is the same as the third embodiment.

Also, although separation portion 20 disposed between each member of door reinforcement portion 33, 33 is formed in a concave groove shape according the third embodiment, as a third modification of the third embodiment, separation portion 20 is formed as a perforation such that the members of door reinforcement portion 33, 33 are intermittently joined. In a further fourth modification, separation portion 20 is formed as a fully divided and continuous slit. Otherwise, the third and fourth modifications of the third embodiment are the same as the third embodiment.

A fourth embodiment according to the present invention will now be explained with reference to FIGS. 23 through 25. Reference numerals are maintained for elements in common with the previous embodiments. Explanation of common elements is abbreviated.

As shown in FIG. 23, hinge portion 37 comprises curved portion 41 which is joined at one end thereof to door reinforcement portion 33, and a lowered joint portion 42 which is joined to another end of curved portion 41 and attachment portion 17, 18 and faces tear seam 24 so as to superimpose tear seam 24. Curved portion 41 is arcuate in cross section, and further, is formed substantially in a U-shape in cross section, and has a bent surface portion facing downward toward a bottom of air bag 9, that is, the bent surface bulges downward toward a bottom of air bag apparatus 3. Lowered joint portion 42 is formed in a horizontal plate shape. Further, a height of an upper surface of lowered joint portion 42, which constitutes a base of hinge portion 37 of backing member 22 and is joined to attachment portion 17, 18, is set at a lower position than a shared height of an upper surface of inner surrounding portion 35 and door reinforcement portion 33, that is, lower than a height of a lower surface of instrument panel 1, this difference in heights being indicated as height L3 in FIG. 23. Thus, an open space portion 74 is formed between lowered joint portion 42 and first tear groove 24a of instrument panel 1, and is enclosed by hinge portion 37, attachment portion 17, 18, and outer surrounding portion 25.

Further, according to the fourth embodiment, a height L3 is set at 2.5 mm. Also, curved portion 41 and lowered joint portion 42 of hinge portion 37 are formed with a set thickness D3 of 3.0 mm which is the same as a shared thickness of inner surrounding portion 35 of backing member 22 and door reinforcement portion 33. Also, a depth H3 from a top surface of door reinforcement portion 33 of backing member 22 to a bottom surface of a lowermost edge of hinge portion 37 is 12.5 mm, and a depth H4 from a top surface of door reinforcement portion 33 to a top surface of a lowermost edge of hinge portion 37 is 10.0 mm, a concave portion width W3 of a concave portion of curved portion 41 of hinge portion 37 at the top surface of backing member 22 is 16.5 mm, and a space portion width W4 across a top surface of lowered joint portion 42 between a location where lowered joint portion 42 joins attachment portion 17, 18 and a location where lowered joint portion 42 joins curved portion 41 is set at 4.8 mm, which is substantially the same as width of a bottom edge of tear seam 24.

Therefore, dividing hinge portion 37 about a central low point B, a door-reinforcement-portion side length, i.e., a length along curved portion 41 from door reinforcement portion 33 to central low point B, is larger than an inner-surrounding-portion side length, i.e., a length along lowered joining portion 42 and curved portion 41 from attachment portion 17, 18 to central low point B.

Further, dimensions of each element, such as height L3 of open space portion 74, are set with consideration of various factors including characteristics of resin used, size of air bag 9, i.e., volume, shape, injection characteristics and specifications of inflator 4, as well as with consideration of inflation test results of air bag apparatus 3.

Once air bag 9 inflates upon injection of gas, as previously explained, door portion 26 is torn free from other portions of instrument panel 1, i.e, from covering portion 11, and as is shown in FIG. 24A, door portion 26 commences swinging, that is, formation, as a freed door portion 76

Next, freed door portion 76 swings with a particular point within open space portion 74 as an axis, and an opening for air bag 9 to expand through is formed.

According to the fourth embodiment, lowered joint portion 42, which is a base of hinge portion 37, is joined to attachment portion 17, 18, and the height of the top surface of lowered joint portion 42 is set at a lower position than the height of the top surface of inner surrounding portion 35 and door reinforcement portion 33, and open space portion 74 is formed between instrument panel 1 and backing member 22. Thus, freed door portion 76 swings with a lower point of support, than if lowered joint portion 42 were not set at a lowered position and instead were set at a position equal in height to inner surrounding portion 35 and door reinforcement portion 33. Also, having an edge portion 47 formed on door portion 76 by tearing of tear seam 24, as shown in FIG. 24B, freed door portion 76 swings so as to be pulled into open space portion 74 located therebelow, and further, edge portion 47 of freed door portion 76 is pulled into a space formed by curved portion 41 of hinge portion 37, and thereby swings smoothly.

Thus, according to the fourth embodiment, lowered joint portion 42, which serves as an inner-surrounding-portion side base of hinge portion 37, is joined to attachment portion 17, 18, and a joining location of lowered portion 42 is at a distance downward from a boundary portion existing between instrument panel 1 and inner surrounding portion 35, and open space portion 74 is formed at the boundary portion on a side of attachment portion 17, 18 which acts as a hinge base of inner surrounding portion 35 for hinge portion 37, therefore, during inflation of air bag 9, freed door portion 76 formed by tearing of tear seam 24 swings with a low point of pivot, and since edge portion 47 of freed door portion 76 enters open space portion 74, freed door portion 76 maintains desirable characteristics and is formed smoothly.

Figure 27A:
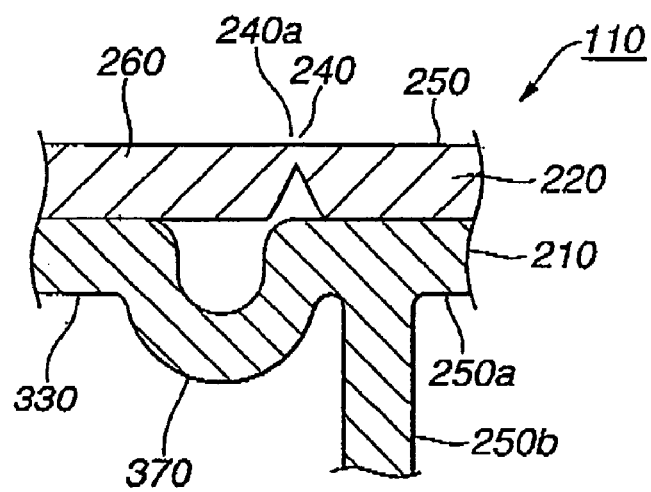
FIG. 27A is a cross-sectional view of a hinge portion according to the related art before expansion of an air bag.
Figure 27B:
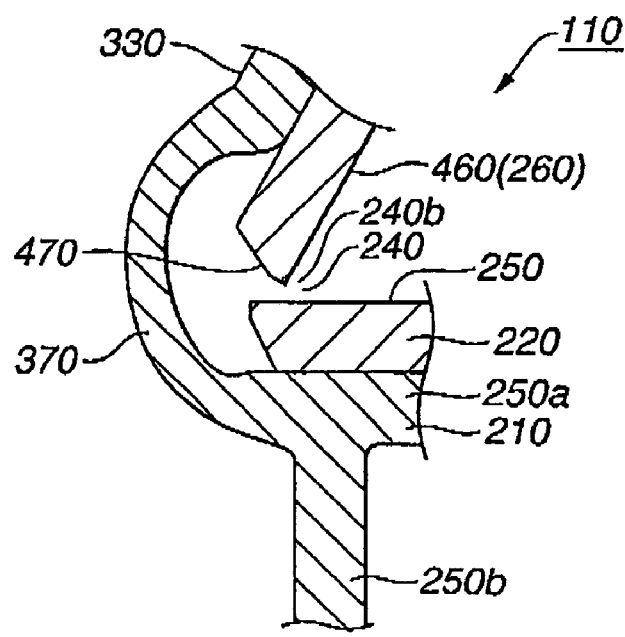
FIG. 27B is a cross-sectional view of the hinge portion of FIG. 27A after expansion of the air bag.

In contrast, an example of the related art is given. With reference to FIG. 27A, a base of a hinge portion 370 is joined to an inner surrounding portion 250a at the same height as a door reinforcement portion 330. Under extreme high temperature conditions, referring to FIG. 27B, there are occurrences of an edge portion 470 of a freed door portion 460 forming and swinging such that edge portion 470 rides on an outer surface of an instrument panel 220, and it is difficult for freed door portion 460 to be stabilized or maintained with desirable characteristics and form smoothly. As regards this matter, according to the fourth embodiment of the present invention, edge portion 47 of freed door portion 76 maintains desirable characteristics without riding on the outer surface of instrument panel 1.

Also, in a modification of the fourth embodiment, a portion of attachment portion 17, 18 which faces open space portion 74 is used as a guide portion for guiding edge portion 47 of freed door portion 76, such that characteristics are easily maintained for forming and swinging movement of freed door portion 76.

As shown in FIG. 25, a guide portion 48 is disposed at a portion of attachment portion 17, 18 which faces open space portion 74, guide portion 48 being an inclined surface which inclines toward curved portion 41 of hinge portion 37. According to this modification, during forming and swinging of freed door portion 76, edge portion 47 of freed door portion 76 slidingly contacts guide portion 4S, and is guided into open space portion 74, and stable characteristics are easily achieved for forming and swinging movement of freed door portion 76. Further, guide portion 48 can be formed with either a flat surface or with a curved surface. Otherwise, this modification of the fourth embodiment is the same as the fourth embodiment.

Although in the fourth embodiment door portion 26 was formed with two portions so as to open in a double-door manner, door portion 26 can also be formed with a single portion.

This application is based on prior Japanese Patent Applications No. 2002-277418, No. 2002-287965, No. 2002-346434, No. 2003-115646, No. 2003-181801, and No. 2003-181802. The entire contents of Japanese Patent Applications No. 2002-277418 with a filing date of Sep. 24, 2002, No. 2002-287965 with a filing date of Sep. 30, 2002, No. 2002-346434 with a filing date of Nov. 28, 2002, No. 2003-115646 with a filing date of Apr. 21, 2003, No. 2003-181801 with a filing date of Jun. 25, 2003, and No. 2003-181802 with a filing date of Jun. 25, 2003 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A cover body covering an air bag apparatus, the cover body being integral with an interior panel of a vehicle, the cover body comprising:
   a covering portion which is formed integrally with an interior panel body, the covering portion having a door portion defined by a tear seam formed in a closed-loop shape in a back surface of the interior panel body, the covering portion being made of polyolefin resin which has a flexual elastic modulus of from 1500 to 3500 MPa, a tensile strength of from 17 to 40 MPa, an Izod impact strength of from 3.0 to 15.0 kJ/m², and an elongation of 400% or less; and
   a backing portion which is joined to a back of the covering portion including the door portion, the backing portion being made of thermoplastic olefin which is softer on the basis of a measurement of flexural elastic modulus and has a greater elongation than the polyolefin resin;
   wherein the backing portion comprises a reinforcing portion joined to a back surface of the door portion, a surrounding base which is joined to the back surface of the covering portion surrounding the door portion and having an attachment portion, and a hinge portion having an end joined to the reinforcing portion and another end joined to the surrounding base.

2. The cover body as claimed in claim 1, wherein the hinge portion comprises
   a first flat portion adjacent to the surrounding base, and
   a second flat portion adjacent to the reinforcing portion, so that the hinge portion is formed in a bent shape in cross section.

3. The cover body as claimed in claim 1, further comprising a joining rib disposed on the backing portion, the joining rib arranged on a surface facing the back surface of the covering portion and joined to the covering portion by vibration welding, the joining rib comprising a first rib portion arranged in a first direction along reciprocative movement of welding, and a second rib portion arranged in a second direction which intersects the first direction,
   wherein at least a portion of the first rib portion having a width equal to or not greater than three times the width of the second rib portion.

4. The cover body as claimed in claim 3, wherein the first rib portion is disposed along at least a portion of the tear seam, the joining rib further comprising a third rib portion disposed along a predetermined direction and having a width the same as that of the second rib portion, the joining rib being formed in high density in proximity to the tear seam.

5. The cover body as claimed in claim 3, wherein the joining rib has a surface area in a range of from 10 to 30 percent of the area of a surface facing the cover body defined by the reinforcing portion and the surrounding base of the backing portion.

6. The cover body as claimed in claim 1, wherein the hinge portion is arranged intermittently along an edge portion defined by the reinforcing portion and the surrounding base so that the edge portion has a pair of intermittent edge portions defined by a reinforcing edge portion and a surrounding edge portion,
   an extended supporting portion being formed at least from one of the reinforcing edge portion and the surrounding edge portion of the intermittent edge portions to the other of the intermittent edge portions.

7. The cover body as claimed in claim 6, wherein a center of the hinge portion and a center of the tear seam are formed with a relative off-center alignment in a surface direction.

8. The cover body as claimed in claim 1, the cover body further comprising a joining portion which tearably links the reinforcing portion and the surrounding base.

9. The cover body as claimed in claim 8, wherein the hinge portion is a curved shape which links the reinforcing portion and the surrounding base, and the joining portion links the reinforcement portion with a shorter length than a circumferential length of the hinge portion.

10. The cover body as claimed in claim 9, wherein the hinge portion comprises a curved surface portion which faces in a direction opposite to a direction of expansion of an air bag contained in the air bag apparatus, and the joining portion is a straight shape.

11. The cover body as claimed in claim 1, wherein the hinge portion is joined to an edge portion of the surrounding base at a location away from the back surface of the covering portion, so that the edge portion of the surrounding base forms a space between the back surface of the covering portion and the hinge portion.

12. The cover body as claimed in claim 11, wherein the hinge portion comprises a U-shaped portion having two ends and a curved surface portion defined therebetween, wherein one end is linked to the reinforcing portion and another end is linked to the surrounding base and a curved surface protrudes toward an air bag stored within the air bag apparatus, and a lower joint portion is arranged in the backing portion so that the lower joint portion substantially superposes the tear seam of the covering portion.

13. The cover body as claimed in claim 12, wherein the surrounding base comprises a guide portion facing the space portion to guide an edge portion of the door portion which is formed by tearing of the tear seam.

* * * * *